US008528029B2

(12) United States Patent
Walker et al.

(10) Patent No.: US 8,528,029 B2
(45) Date of Patent: Sep. 3, 2013

(54) APPARATUS AND METHODS OF OPEN AND CLOSED PACKAGE SUBSCRIPTION

(75) Inventors: Gordon Kent Walker, Poway, CA (US); An Mei Chen, San Diego, CA (US); Bruce Collins, San Diego, CA (US); Joseph Barone, San Diego, CA (US); Mark Charlebois, San Diego, CA (US); Carlos Marcelo Pazos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 412 days.

(21) Appl. No.: 11/270,372

(22) Filed: Nov. 8, 2005

(65) Prior Publication Data

US 2007/0061860 A1  Mar. 15, 2007

Related U.S. Application Data

(60) Provisional application No. 60/716,409, filed on Sep. 12, 2005, provisional application No. 60/735,044, filed on Nov. 8, 2005.

(51) Int. Cl.
*H04N 7/16* (2011.01)
*H04N 7/173* (2011.01)
*G06F 15/16* (2006.01)
*G06F 3/00* (2006.01)

(52) U.S. Cl.
USPC ............ 725/97; 709/228; 725/61; 725/5; 725/40; 725/87

(58) Field of Classification Search
USPC ......................... 725/9–21, 86–104
See application file for complete search history.

(56) References Cited

U.S. PATENT DOCUMENTS 4,600,921 A * 7/1986 Thomas ............... 340/5.74
5,491,774 A   2/1996 Norris et al.
5,604,528 A * 2/1997 Edwards et al. ......... 725/25
(Continued)

FOREIGN PATENT DOCUMENTS

CA   2548227 A1   6/2005
CN   1212577 A    3/1999
(Continued)

OTHER PUBLICATIONS

Patrice Peyret et al.; Smart Cards Provide Very High Security and Flexibility in Subscribers Management; Aug. 1990; IEE Transactions and Consumer Electronics, vol. 36, No. 3, pp. 744-752.*

(Continued)

*Primary Examiner* — Charles Appiah
*Assistant Examiner* — Natasha Cosme
(74) *Attorney, Agent, or Firm* — The Marbury Law Group, PLLC

(57) ABSTRACT

Apparatus and method for providing and receiving media programming information including providing programming package information comprising attributes of a package of media presentation channels. Further, a subscription characteristic is defined that determines an ability subscribe to the package and to present the programming package information on a device. The device operates to compare the subscription characteristic with device-related subscription information. A subscription is allowed and/or the programming package information is presented on the device based on a predetermined relationship between the subscription characteristic and the device subscription information.

85 Claims, 9 Drawing Sheets

(56) References Cited

U.S. PATENT DOCUMENTS

| | | | |
|---|---|---|---|
| 5,652,759 A | 7/1997 | Stringfellow, Jr. | |
| 5,659,350 A | 8/1997 | Hendricks et al. | |
| 5,696,500 A | 12/1997 | Diem | |
| 5,717,923 A | 2/1998 | Dedrick | |
| 5,805,763 A | 9/1998 | Lawler et al. | |
| 5,978,649 A * | 11/1999 | Kahn | 725/25 |
| 6,016,141 A | 1/2000 | Knudson et al. | |
| 6,075,526 A | 6/2000 | Rothmuller | |
| 6,088,722 A | 7/2000 | Herz et al. | |
| 6,122,658 A | 9/2000 | Chaddha | |
| 6,230,203 B1 | 5/2001 | Koperda et al. | |
| 6,314,573 B1 * | 11/2001 | Gordon et al. | 725/61 |
| 6,477,707 B1 * | 11/2002 | King et al. | 725/97 |
| 6,505,347 B1 | 1/2003 | Kaneko et al. | |
| 6,536,041 B1 | 3/2003 | Knudson et al. | |
| 6,614,573 B1 | 9/2003 | Cao | |
| 6,654,423 B2 | 11/2003 | Jeong et al. | |
| 6,671,853 B1 | 12/2003 | Burkett et al. | |
| 6,678,215 B1 | 1/2004 | Treyz et al. | |
| 6,729,929 B1 | 5/2004 | Sayers et al. | |
| 6,760,916 B2 | 7/2004 | Holtz et al. | |
| 6,785,551 B1 | 8/2004 | Richard | |
| 6,857,012 B2 | 2/2005 | Sim et al. | |
| 6,863,557 B2 | 3/2005 | Mills et al. | |
| 6,886,017 B1 | 4/2005 | Jackson et al. | |
| 6,895,486 B2 | 5/2005 | Wong et al. | |
| 6,918,132 B2 | 7/2005 | Gargi | |
| 6,983,327 B2 | 1/2006 | Koperda et al. | |
| 7,003,117 B2 | 2/2006 | Kacker et al. | |
| 7,017,174 B1 | 3/2006 | Sheedy | |
| 7,043,225 B1 | 5/2006 | Patel et al. | |
| 7,053,958 B2 | 5/2006 | Collins et al. | |
| 7,085,291 B2 | 8/2006 | Zhang et al. | |
| 7,093,754 B2 | 8/2006 | Sako | |
| 7,113,776 B2 | 9/2006 | Minear et al. | |
| 7,117,439 B2 | 10/2006 | Barrett et al. | |
| 7,120,932 B2 | 10/2006 | Lockhart et al. | |
| 7,149,189 B2 | 12/2006 | Huntington et al. | |
| 7,194,756 B2 | 3/2007 | Addington et al. | |
| 7,257,634 B2 | 8/2007 | Colby et al. | |
| 7,305,074 B2 | 12/2007 | Hartung et al. | |
| 7,376,964 B1 | 5/2008 | Kim | |
| 7,386,871 B1 | 6/2008 | Knudson et al. | |
| 7,424,708 B2 | 9/2008 | Andersson et al. | |
| 7,506,262 B2 | 3/2009 | Gupta et al. | |
| 7,565,506 B2 | 7/2009 | Chen et al. | |
| 7,600,245 B2 | 10/2009 | Steading et al. | |
| 7,620,574 B2 | 11/2009 | Buehl et al. | |
| 2001/0037238 A1 | 11/2001 | Gotoh et al. | |
| 2001/0052133 A1 | 12/2001 | Pack et al. | |
| 2002/0016801 A1 | 2/2002 | Reiley et al. | |
| 2002/0042915 A1 | 4/2002 | Kubischta et al. | |
| 2002/0054146 A1 | 5/2002 | Fukumoto et al. | |
| 2002/0059603 A1 | 5/2002 | Kelts | |
| 2002/0124259 A1 | 9/2002 | Chang et al. | |
| 2002/0144291 A1 | 10/2002 | Smiley et al. | |
| 2002/0157002 A1 | 10/2002 | Messerges et al. | |
| 2002/0188663 A1 | 12/2002 | Islam et al. | |
| 2002/0194599 A1 | 12/2002 | Mountain | |
| 2003/0037331 A1 * | 2/2003 | Lee | 725/32 |
| 2003/0040850 A1 | 2/2003 | Najmi et al. | |
| 2003/0069881 A1 | 4/2003 | Huttunen | |
| 2003/0072257 A1 | 4/2003 | Ikedo et al. | |
| 2003/0100326 A1 | 5/2003 | Grube et al. | |
| 2003/0110297 A1 | 6/2003 | Tabatabai et al. | |
| 2003/0117445 A1 | 6/2003 | Hendricks et al. | |
| 2003/0154492 A1 | 8/2003 | Falvo et al. | |
| 2003/0187916 A1 | 10/2003 | Dettinger et al. | |
| 2003/0191816 A1 | 10/2003 | Landress et al. | |
| 2003/0212999 A1 | 11/2003 | Cai | |
| 2003/0226151 A1 | 12/2003 | Hamada et al. | |
| 2003/0233561 A1 | 12/2003 | Ganesan et al. | |
| 2004/0003405 A1 | 1/2004 | Boston et al. | |
| 2004/0024809 A1 | 2/2004 | Edwards et al. | |
| 2004/0025179 A1 | 2/2004 | Russ et al. | |
| 2004/0028049 A1 | 2/2004 | Wan | |
| 2004/0031049 A1 | 2/2004 | Suzuki et al. | |
| 2004/0039916 A1 | 2/2004 | Aldis et al. | |
| 2004/0040039 A1 | 2/2004 | Bernier | |
| 2004/0043763 A1 | 3/2004 | Minear et al. | |
| 2004/0048503 A1 | 3/2004 | Mills et al. | |
| 2004/0083492 A1 | 4/2004 | Goode et al. | |
| 2004/0117822 A1 | 6/2004 | Karaoguz et al. | |
| 2004/0117857 A1 | 6/2004 | Bisdikian et al. | |
| 2004/0153547 A1 * | 8/2004 | Trossen | 709/228 |
| 2004/0177383 A1 | 9/2004 | Martinolich et al. | |
| 2004/0193545 A1 | 9/2004 | Shlasky | |
| 2004/0216158 A1 | 10/2004 | Blas | |
| 2004/0226048 A1 | 11/2004 | Alpert et al. | |
| 2004/0236854 A1 | 11/2004 | Roy et al. | |
| 2004/0261114 A1 | 12/2004 | Addington et al. | |
| 2004/0268420 A1 | 12/2004 | Addington et al. | |
| 2005/0010653 A1 | 1/2005 | McCanne | |
| 2005/0015765 A1 | 1/2005 | Covell et al. | |
| 2005/0015803 A1 | 1/2005 | Macrae et al. | |
| 2005/0078677 A1 | 4/2005 | Benting et al. | |
| 2005/0085183 A1 | 4/2005 | Lee | |
| 2005/0090235 A1 | 4/2005 | Vermola et al. | |
| 2005/0108770 A1 | 5/2005 | Karaoguz et al. | |
| 2005/0120369 A1 | 6/2005 | Matz | |
| 2005/0132207 A1 | 6/2005 | Mourad | |
| 2005/0154679 A1 | 7/2005 | Bielak | |
| 2005/0182852 A1 | 8/2005 | Tinsley et al. | |
| 2005/0188403 A1 | 8/2005 | Kotzin | |
| 2005/0244148 A1 | 11/2005 | Tsumagari et al. | |
| 2005/0264704 A1 | 12/2005 | Leinonen | |
| 2005/0276246 A1 | 12/2005 | Walker et al. | |
| 2006/0031882 A1 * | 2/2006 | Swix et al. | 725/46 |
| 2006/0059045 A1 | 3/2006 | Babbar et al. | |
| 2006/0095410 A1 | 5/2006 | Ostrover et al. | |
| 2006/0107282 A1 | 5/2006 | De Heer | |
| 2006/0112182 A1 | 5/2006 | Chen et al. | |
| 2006/0136905 A1 | 6/2006 | Thissen et al. | |
| 2006/0200745 A1 | 9/2006 | Furmanski et al. | |
| 2006/0205395 A1 | 9/2006 | Barone et al. | |
| 2006/0218590 A1 | 9/2006 | White | |
| 2006/0277576 A1 | 12/2006 | Acharya et al. | |
| 2007/0055629 A1 | 3/2007 | Walker et al. | |
| 2007/0067597 A1 | 3/2007 | Chen et al. | |
| 2007/0073834 A1 | 3/2007 | Charlebois et al. | |
| 2007/0074240 A1 | 3/2007 | Addington et al. | |
| 2007/0078944 A1 | 4/2007 | Charlebois et al. | |
| 2007/0104220 A1 | 5/2007 | Charlebois | |
| 2007/0106522 A1 | 5/2007 | Collins | |
| 2007/0115929 A1 | 5/2007 | Collins et al. | |
| 2007/0117536 A1 | 5/2007 | Walker et al. | |
| 2008/0194196 A1 | 8/2008 | Angelhag et al. | |
| 2008/0263599 A1 | 10/2008 | Knudson et al. | |
| 2009/0125952 A1 | 5/2009 | Chen et al. | |
| 2009/0150922 A1 | 6/2009 | Russ et al. | |
| 2010/0154000 A1 | 6/2010 | Macrae et al. | |

FOREIGN PATENT DOCUMENTS

| | | |
|---|---|---|
| CN | 1301454 A | 6/2001 |
| CN | 1303568 A | 7/2001 |
| CN | 1310549 A | 8/2001 |
| CN | 1568603 | 1/2005 |
| EP | 0609936 | 8/1994 |
| EP | 0749221 A2 * | 5/1995 |
| EP | 0749221 A2 | 12/1996 |
| EP | 1089560 | 4/2001 |
| EP | 0820193 | 4/2002 |
| EP | 1193976 | 4/2002 |
| JP | 63036625 A | 2/1988 |
| JP | 1994291780 | 10/1994 |
| JP | 8506938 | 7/1996 |
| JP | 08506941 | 7/1996 |
| JP | 08506942 | 7/1996 |
| JP | 8275077 A | 10/1996 |
| JP | 10276380 A | 10/1998 |
| JP | 11155138 | 6/1999 |
| JP | 1999175426 | 7/1999 |
| JP | 2000349725 A | 12/2000 |
| JP | 2001054089 A | 2/2001 |

| | | | |
|---|---|---|---|
| JP | 2001092880 A | 4/2001 | |
| JP | 2001217860 A | 8/2001 | |
| JP | 2001230996 A | 8/2001 | |
| JP | 2001519626 A | 10/2001 | |
| JP | 2002508637 T | 3/2002 | |
| JP | 2002125161 A | 4/2002 | |
| JP | 2002171228 A | 6/2002 | |
| JP | 2002176589 A | 6/2002 | |
| JP | 2003101812 A | 4/2003 | |
| JP | 2003134490 A | 5/2003 | |
| JP | 2003203035 A | 7/2003 | |
| JP | 2003289520 A | 10/2003 | |
| JP | 2004007063 A | 1/2004 | |
| JP | 2004046833 | 2/2004 | |
| JP | 2004056178 A | 2/2004 | |
| JP | 2004-186741 A | 7/2004 | |
| JP | 2004287978 A | 10/2004 | |
| JP | 2005039853 | 2/2005 | |
| JP | 2005079989 A | 3/2005 | |
| JP | 2005149129 A | 6/2005 | |
| JP | 2006135388 | 5/2006 | |
| KR | 19990021860 | 3/1999 | |
| KR | 1020000059098 | 10/2000 | |
| KR | 20010034740 | 4/2001 | |
| KR | 20030001368 | 1/2003 | |
| RU | 2073913 C1 | 2/1997 | |
| RU | 2220513 | 12/2003 | |
| RU | 2239293 | 10/2004 | |
| RU | 2254611 | 6/2005 | |
| RU | 2321965 | 4/2008 | |
| TW | I226797 | 1/2005 | |
| TW | I233560 | 6/2005 | |
| TW | 200523781 | 7/2005 | |
| TW | I242190 | 10/2005 | |
| WO | 9414282 | 6/1994 | |
| WO | WO9414279 | 6/1994 | |
| WO | WO9843427 | 1/1998 | |
| WO | 9843426 | 10/1998 | |
| WO | 9918721 A1 | 4/1999 | |
| WO | WO9949663 | 9/1999 | |
| WO | WO9952285 A1 | 10/1999 | |
| WO | 0021006 | 4/2000 | |
| WO | 0028742 | 5/2000 | |
| WO | 0033197 | 6/2000 | |
| WO | 0163900 | 8/2001 | |
| WO | WO0217567 | 2/2002 | |
| WO | 0239741 | 5/2002 | |
| WO | 02065803 | 8/2002 | |
| WO | 02084524 | 10/2002 | |
| WO | 02087273 | 10/2002 | |
| WO | 02099673 | 12/2002 | |
| WO | WO03003704 A2 | 1/2003 | |
| WO | WO04002187 | 12/2003 | |
| WO | 2004021671 | 3/2004 | |
| WO | 2004079589 | 9/2004 | |
| WO | 2005022791 | 3/2005 | |
| WO | 2005045603 | 5/2005 | |
| WO | WO2005060257 A1 | 6/2005 | |
| WO | 2005069624 | 7/2005 | |
| WO | 2006015226 | 2/2006 | |
| WO | 2006099239 | 9/2006 | |
| WO | WO2007033143 | 3/2007 | |

OTHER PUBLICATIONS

Das, S., "STAR News Goes Pay, to Attract Flat Rate of Rs 2," Financial Express, Aug. 4, 1999.
ESG Datamodel Comparison between OMA BCAST and DVB CBMS, Aug. 22, 2005, Open Mobile Alliance Ltd.
Landler, M., "The Dishes Are Coming: Satellites Go Suburban," New York Times, Late Edition—Final Ed., col. 5, p. 37, May 29, 1995.
Miller, A.L., "Cable Company Changes Channels Prestige Offers Cheaper Service," Baltimore Morning Sun, CAR edition, p. 8B, Oct. 21, 1992.
Steinberg, D., "Comcast to Roll out New Sports Package for Digital Cable," Philadelphia Inquirer, City edition, p. D02, Aug. 1, 2004.
Taiwanese Search report—095133272—TIPO—Oct. 7, 2010.
Supplementary European Search Report—EP06803088—Search Authority—The Hague—Feb. 10, 2011.
Taiwanese Search report—095133703—TIPO—Apr. 8, 2010.
Tomoko Itao, Introduction of Dynamically Adaptive Networking Service Environment: DANSE, Multimedia, Distributed, Cooperative and Mobile (DICOMO), Symposium Collected Papers, 1997-2000, Ver. 1 .1. [DVD-ROM], Japan, Aggregate Corporation Information Processing Society, Jul. 2, 1997, pp. 125-130.
Translation of Office Action in Canadian application 2621676 corresponding to U.S. Appl. No. 12/353,869, citing CA2548227 and US20040048503 dated Feb. 8, 2011.
Translation of Office Action in Chinese application 200680041815.8 corresponding to U.S. Appl. No. 11/270,372, citing CN1303568 dated Mar. 18, 2011.
Translation of Office Action in Japan application 2008-540332 corresponding to U.S. Appl. NO. 11/270,165, citing WO2005045603A2, IPDC_in_DVB_H_pgs_1_40_XP002990830_year_2004, JP2005039853 and JP11155138 dated Mar. 8, 2011.
Translation of Office Action in Japan application 2008-540334 corresponding to U.S. Appl. No. 11/270,167, citing JP8506938 and JP2006135388 dated Feb. 8, 2011.
Xstream: A Middleware for Streaming XML Contents over Wireless Environments, Wugene Y.C.Wong, etc., Software Engineering, IEEE Transactions on,Jan. 10, 2005.
Masuda, Kazuo, "Visual Explorer of Kazuo Masuda," PC User, Softbank Publishing Corp., Mar. 2005, vol. 12, No. 3, pp. 78-81.
Taiwanese Search report—TW095133703—TIPO—Jul. 23, 2011.
Earnshaw, et al., "The TV-Anytime Content Reference Identifier," Network Working Group, RFC 4078, May 2005.
Wong, at al., "Xstream: A Middleware for Streaming XML Contents over Wireless Environments," IEEE Transactions on Software Engineering, vol. 30, No. 12, Dec. 2004, pp. 918-935.
Wong, et al., "Efficient Management of XML Contents over Wireless Environment by Xstream." 2004 ACM Symposium on Applied Computing, pp. 1122-1127.
ISO-IEC 15706, Information and documentation—International standard Audiovisual Number (ISAN), 2002.
IPDC in DVB-H: Technical Requirements CBMS1026 v1.0.0 Rev. 1/TM 3095 Rev.2, 2004.
OMA: "Mobile Broadcast Services Requirements" Candidate Version 1.0, Feb. 3, 2005, pp. 1-69, pp. 14-21.
International Search Report—PCT/US06/035440, International Search Authority—European Patent Office, Jan. 22, 2007.
Written Opinion—PCT/US06/035440, International Search Authority—European Patent Office, Jan. 22, 2007.
International Preliminary Report on Patentability—PCT/US06/035440, The International Bureau of WIPO—Geneva, Switzerland, Mar. 22, 2008.

* cited by examiner

APPARATUS AND METHODS OF OPEN AND CLOSED PACKAGE SUBSCRIPTION

CLAIM OF PRIORITY UNDER 35 U.S.C. §119

The present Application for Patent claims priority to Provisional Application No. 60/716,409, entitled "SYSTEM OF OPEN AND CLOSED PACKAGE SUBSCRIPTION," filed Sep. 12, 2005, and assigned to the assignee hereof and hereby expressly incorporated by reference herein.

REFERENCE TO CO-PENDING APPLICATIONS FOR PATENT

The present Application for Patent is related to the following co-pending U.S. Patent Applications: "METHODS AND APPARATUS FOR DISTRIBUTING CONTENT TO SUPPORT MULTIPLE CUSTOMER SERVICE ENTITIES AND CONTENT PACKAGERS", published as U.S. Patent Application Publication No. 2007/0055629 on Mar. 8, 2007, filed concurrently herewith, assigned to the assignee hereof, and expressly incorporated by reference herein, "METHOD AND APPARATUS FOR DELIVERING CONTENT BASED ON RECEIVERS CHARACTERISTICS", issued as U.S. Pat. No. 7,565,506 on Jul. 21, 2009, filed concurrently herewith, assigned to the assignee hereof, and expressly incorporated by reference herein, "APPARATUS AND METHODS FOR PROVIDING AND PRESENTING CUSTOMIZED CHANNEL INFORMATION", published as U.S. Patent Application Publication No. 2007/0073834 on Mar. 29, 2007, filed concurrently herewith, assigned to the assignee hereof, and expressly incorporated by reference herein, "APPARATUS AND METHODS FOR DELIVERING AND PRESENTING AUXILIARY SERVICES FOR CUSTOMIZING A CHANNEL", published as U.S. Patent Application Publication No. 2007/0078944 on Apr. 5, 2007, filed concurrently herewith, assigned to the assignee hereof, and expressly incorporated by reference herein, "METHODS AND APPARATUS FOR DELIVERING REGIONAL PARAMETERS", published as U.S. Patent Application Publication No. 2007/0117536 on May 24, 2007, filed concurrently herewith, assigned to the assignee hereof, and expressly incorporated by reference herein, "METHODS AND APPARATUS FOR FRAGMENTING SYSTEM INFORMATION MESSAGES IN WIRELESS NETWORKS", published as U.S. Patent Application Publication No. 2007/0104220 on May 10, 2007, filed concurrently herewith, assigned to the assignee hereof, and expressly incorporated by reference herein, "FLEXIBLE SYSTEM FOR DISTRIBUTING CONTENT TO A DEVICE", published as U.S. Patent Application Publication No. 2007/0115929 on May 24, 2007, filed concurrently herewith, assigned to the assignee hereof, and expressly incorporated by reference herein, "SYSTEM FOR DISTRIBUTING PACKAGES AND CHANNELS TO A DEVICE" published as U.S. Patent Application Publication No. 2007/0106522 on May 10, 2007, filed concurrently herewith, assigned to the assignee hereof, and expressly incorporated by reference herein; and "METHODS AND APPARATUS FOR PROVIDING SYSTEM INFORMATION", United States Provisional Patent Application No. 60/735,044, filed Nov. 8, 2005, assigned to the assignee hereof, and expressly incorporated by reference herein.

BACKGROUND

The disclosed embodiments relate generally to the operation of content distribution systems, and amongst other things, to apparatus and methods for an open and closed package subscription.

A media distribution system may include retailers who provide multimedia services to subscribers. For example, a content provider that operates on a distribution network may provide content or services to one or more content retailers in communication with the network. In turn, the content retailers define channels based on the content or services, and packages based on different sets of channel. The content retailers, or in some cases another billing and customer service provider, then provides information about the packages to device users who then may select content or services to be received by a device, typically on a subscription basis. For example, a device user may select and/or subscribe to receive content or services that include multimedia content, clips, programs, scripts, data, customer services, or any other type of content or service.

The content retailers and/or billing and customer service providers, however, often have the need to change their offering of packages. For example, the content retailer may need to revise programming line-ups, or price structures, etc., to attract new subscriptions. A device user already having a subscription, however, may get annoyed if the subscription terms are changed arbitrarily. So, despite having solid motivations for changing subscription line-ups and pricing, the content retailer and/or billing and customer service provider risks offending current subscribers by doing so.

Thus, improved apparatus and methods are desired for managing changes to multimedia programming packages.

SUMMARY

The described embodiments provide systems, apparatus and methods of providing and receiving media content information based on an open or closed state associated with the information. In these embodiments, an open state refers to information that is available to all users, while a closed state refers to information having limited availability based on a specific subscription.

Aspects of methods of providing media program information comprises providing package information relating to a package of media presentation are provided. The method further may include providing a characteristic that determines a permission to subscribe to the package and a corresponding permission to present the package information on a device based on a subscription associated with the device. Additionally, the method may include transmitting the definition of the package information and the definition of the characteristic to the device. In related embodiments, at least one processor is configured to perform the above-described actions. In other related embodiments, a computer program resident in a computer readable medium that, when executed, directs a computer device to perform the actions noted above.

In further embodiments, an apparatus for providing media program information comprises a means for providing package information relating to a package of media presentation channels. The apparatus also comprises a means for providing a characteristic that determines a permission to subscribe to the package and a corresponding permission to present the package information on a device based on a subscription associated with the device. Additionally, the apparatus comprises a means for transmitting the definition of the package information and the definition of the characteristic to the device.

In additional embodiments, an apparatus for providing media program information comprises a content server having package information providing a package of media presentation channels. The package information comprises a package subscription characteristic that determines a permission to subscribe to the package and a corresponding permission to present the package information on a device based on a subscription associated with the device. The apparatus further comprises a generator operable to generate a message for transmission to the device. The message comprises the package information and the package subscription characteristic.

In yet further embodiments, a method of providing one or more packages of media programming comprises providing information associated with a first programming package and providing information associated with a second programming package. The method further comprises permitting a presentation to both of the first package and the second package for a first subscriber having a first subscription. Additionally, the method comprises prohibiting a subscription to and a presentation of the information associated with at least one of the first package and the second package for a second subscriber having a second subscription, wherein the second subscription is different from the first subscription. In related embodiments, at least one processor is configured to perform the above-described actions. In other related embodiments, a computer program resident in a computer readable medium that, when executed, directs a computer device to perform the actions noted above In still other embodiments, an apparatus for providing media program information comprises a means for providing information associated with a first programming package, and a means for providing information associated with a second programming package. The apparatus also comprises a means for permitting a presentation to both of the first package and the second package for a first subscriber having a first subscription. Additionally, the apparatus comprises a means for prohibiting a subscription to and presentation of the information associated with at least one the first package and the second package for a second subscriber having a second subscription, wherein the second subscription is different from the first subscription.

In further embodiments, an apparatus for providing media program information comprises a content server comprising a first set of package information corresponding to a first media programming package having a first subscription characteristic. The content server further comprises a second set of package information corresponding to a second media programming package having an second subscription characteristic, wherein the second programming package is different from the first programming package, and wherein at least one of the first subscription characteristic and the second subscription characteristic is operable to permit a presentation of the corresponding set of package information only on a device having a current subscription to the corresponding programming package, while prohibiting any new subscriptions to the corresponding package. Additionally, the apparatus comprises a generator operable to generate a message for transmission across a network. The message comprises the first set of package information, the second set of package information, the first subscription characteristic and the second subscription characteristic.

In yet more embodiments, a method of receiving media programming information comprises receiving programming package information comprising attributes of a package of media presentation channels. The method also comprises receiving a subscription characteristic that determines a permission to present the programming package information. Further, the method comprises comparing the subscription characteristic with device subscription information associated with a device. Additionally, the method comprises presenting the programming package information on the device based on a predetermined relationship between the subscription characteristic and the device subscription information. In related embodiments, at least one processor is configured to perform the above-described actions. In other related embodiments, a computer program resident in a computer readable medium that, when executed, directs a computer device to perform the actions noted above In further embodiments, an apparatus for receiving media program information comprises a means for receiving programming package information comprising attributes of a package of media presentation channels. The apparatus also comprises a means for receiving a subscription characteristic that determines a permission to present the programming package information. Further, the apparatus comprises a means for comparing the subscription characteristic with device subscription information associated with a device. Additionally, the apparatus comprises a means for presenting the programming package information on the device based on a predetermined relationship between the subscription characteristic and the device subscription information.

In still other embodiments, an apparatus for receiving media program information comprises a computer platform operable to present media content. The apparatus also comprises a data repository comprising programming package information and device subscription information. The programming package information may include attributes of a package of media presentation channels, where the attributes comprise a subscription characteristic that determines a permission to subscribe to and to present the programming package information. The device subscription information identifies one or more subscribed packages. The apparatus further comprises a media manager module having a permission controller and a media generator. The permission controller is operable to generate a package permission decision based on a predetermined relationship between the package information and the device subscription information. The media generator is operable to initiate presentation of at least a portion of the programming package information on the device based on the package permission decision.

DETAILED DESCRIPTION

The following detailed description describes one or more embodiments of a content delivery system. The system is especially well suited for use in wireless network environments, but may be used in any type of network environment, including but not limited to, communication networks, public networks, such as the Internet, private networks, such as virtual private networks (VPN), local area networks, wide area networks, long haul networks, or any other type of data or communication network.

This system provides end to end support for open and closed packages of multimedia content in a subscription-based media distribution system. An open package is open to new subscribers, while a closed package is only available to existing subscribers to the closed package. A closed package may continue to exist in the system, but is permitted to be displayed only on devices that are already subscribed to the closed packages.

The open/closed characteristic or state of a package allows the content retailer to modify package/subscription terms for new packages/subscriptions without impacting existing subscriptions. For example, a content retailer may create a new package that is essentially the same as an old package, but with an unpopular offering (i.e. channel) removed. In this case, the old package may be assigned a closed state to prohibit new subscriptions and thereby avoiding annoying the existing subscriber base. As such, the configuration of open and closed package states permits a package to be smoothly retired. For example, the closed package can be removed from the records that are broadcasted to all devices when the closed package no longer has any subscribers.

Additionally, the described embodiments allow the content retailer to offer packages with special, limited-time subscription deals in order to attract new subscriptions without impacting existing subscriptions.

Further, the described embodiments allow for changes to any and all characteristics and/or attributes of the closed package.

The system may include: controls to set a state of an existing or proposed package; system information that identifies the package subscription state, i.e. open and viewable by all potential subscribers, or closed and only viewable by current subscribers; a distribution system for transmitting the system information; and, a device that receives and adheres to the access/presentation restrictions defined by the package subscription state.

In the following description, the term "package" refers to a "purchase item" that groups one or more channels or services that an end user can purchase or subscribe to.

Figure 1:
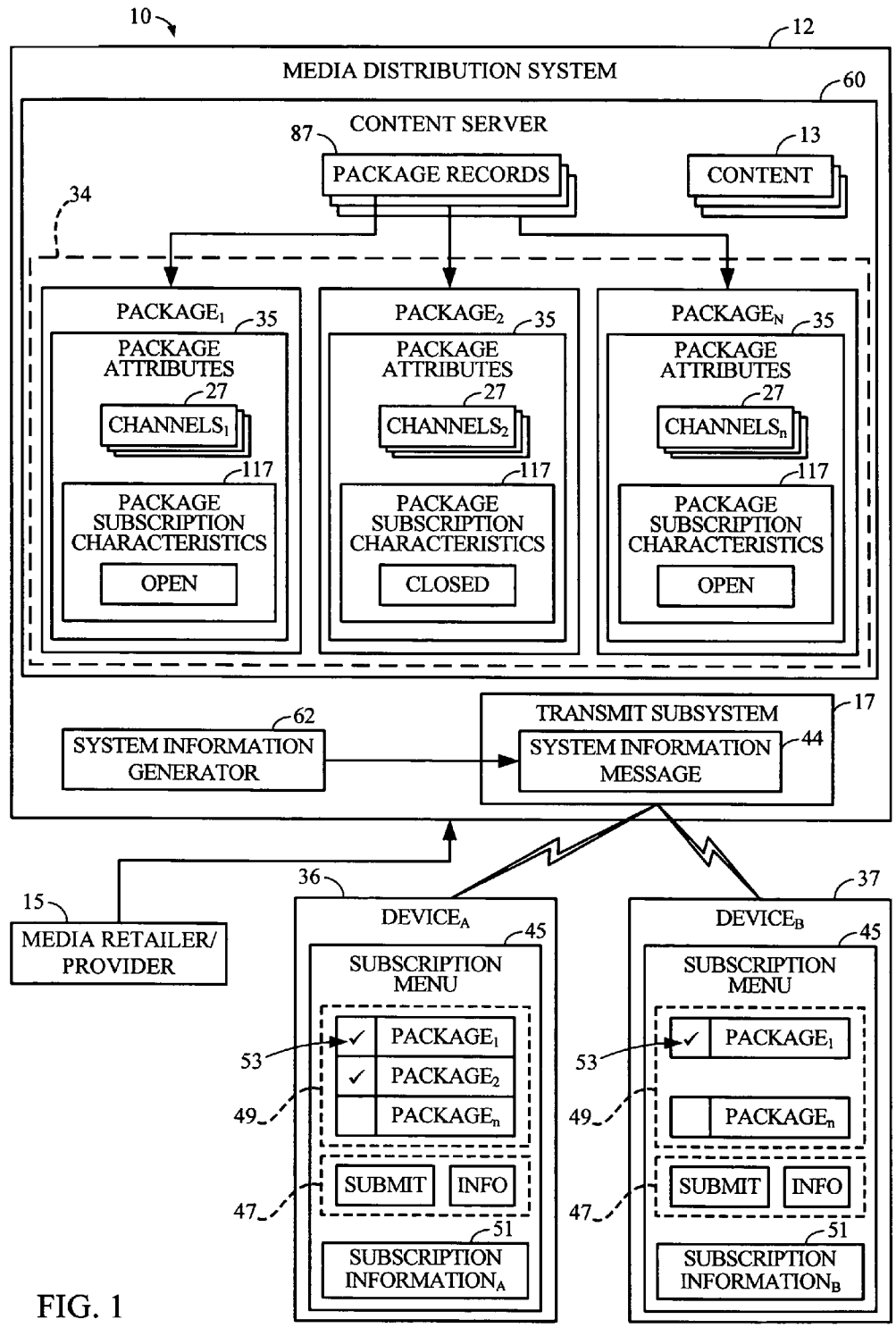
FIG. 1 is a schematic diagram of a portion of embodiments of a system for providing media programming information.

Referring to FIG. 1, embodiments of a portion of a system 10 for providing open and closed package subscriptions may include a media distribution system (MDS) 12 having a content server 60 that stores content 13. As will be discussed below, content 13 may include any type of real time and/or non real time multimedia. Additionally, MDS 12 receives, from a media retailer/provider 15, package records 87 that define multimedia packages 34 that may be offered to users for subscription.

For example, each package record 87 may define a set of channels, where each channel represents a view of a multimedia service corresponding to the given media retailer/provider 15. Further, each channel comprises predetermined combinations of presentations, which correspondingly comprise predetermined combinations of content 13.

In any case, the given package record 87 for each of the plurality of packages 34 may include package attributes 35 that define the given package 34. For example, package attributes 35 include the given set of channels 27 associated with the package, and a package subscription characteristic 117 that defines an attribute related to subscribing to the package. For example, package subscription characteristic 117 may comprise an "open" state, indicating that the package is available for new subscriptions, and that the associated package record and package attributes may be viewed by any current or potential subscriber. In contrast, package subscription characteristic 117 may comprise a "closed" state, indicating that the package is not available for new subscriptions, and limiting presentation of the associated package record and package attributes only to existing subscribers to the package.

Additionally, MDS 12 may include a system information (SI) generator 62 that gathers package records 87 and content 13, among other things, and generates a system information (SI) message, or messages, 44. A transmit subsystem 17 associated with MDS 12 receives and transmits SI message 44 to devices capable of receiving and playing multimedia content, such as wireless devices 36 and 37, associated with media retailer/provider 15 and/or MDS 12. SI message 44 may include all of the information necessary for such devices to view offerings of packages 34 from media retailers/providers 15, subscribe and/or unsubscribe from packages, and/or present multimedia content associated with a given package.

For example, in one non-limiting case, each device 36 and 37 is associated with a media retailer/provider 15 offering a set of packages 34, identified as Packages 1 to n, where n is a positive integer, for subscription. After receiving SI message 44, each device 36 and 37 may present a user with a view of a subscription menu 45, as well as one or more function keys 47, on a user interface 38. In one example, function keys 47 may include a "Submit" key to request a subscription, and an "Info" key to request additional information about a selected package. It should be noted, however, that functions keys 47 may provide any desired function.

Generally, the view of subscription menu 45 may include a package list 49 of all packages 34 available from the associated media retailer/provider 15. As noted above, however, the permission for allowing presentation of a given set of package information may be limited by package subscription characteristic 117 associated with the package. In this case, package subscription characteristic 117 that comprises an "open" state allows the given package information to be presented, while a "closed" state requires an existing subscription to the given package before allowing presentation of the associated package information. In the particular case represented by FIG. 1, information associated with Package 2 can only be presented on a device having an existing subscription because of the "closed" package subscription characteristic 117.

For example, in this case, based on subscription information 51 of device 36, the device has an existing subscription to Package 2, and therefore is permitted to present Package 2 in package list 49 along with all of the other packages of media retailer/provider 15. In contrast, based on subscription information 51 of device 37, the device does not have an existing subscription to Package 2, and therefore is prohibited from presenting Package 2 in package list 49, which may include all of the other open packages of media retailer/provider 15.

Thus, although each device 36 and 37 receives SI message 44, which may include all of the information/attributes of each package 34 associated with one or more content retailers, each device 36 and 37 essentially filters the records so that they only review packages associated with their associated retailer/provider 15, and further filters each package record so that only packages with predetermined relationships to their respective subscription information are presented.

Additionally, package list 49 may include an indicator 53 that confirms existing subscriptions to a given package, based on package information 51. Alternatively, indicator 51 may allow a user to select a given package for which a subscription may be requested.

Further, although the limiting of the presentation of package information associated with Package 2 in the above example is described with regard to providing a view of package list 49, it should be understood that any other presentation of information is included, such as views of presentations of real time, non real time, and combined content.

Additionally, the illustrated view of subscription menu 45 is only one example of many possible implementations of a subscription menu. For instance, rather than having a list with check boxes next to the subscription packages, there may be an available list and a subscribe to list.

Figure 2:
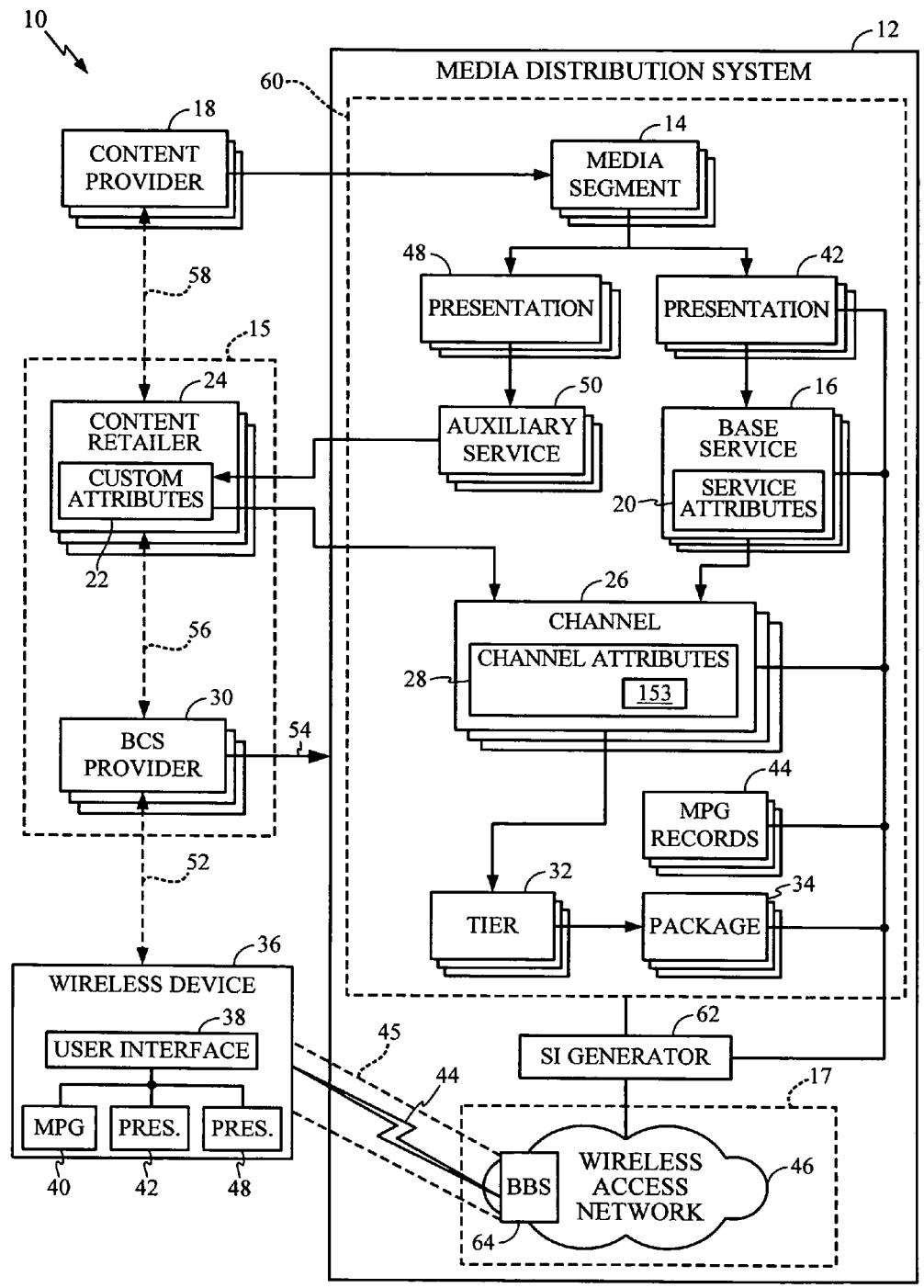
FIG. 2 is a schematic diagram of embodiments of an extended portion of the system of FIG. 1.

Referring to FIG. 2, embodiments of a more detailed architecture of system 10 may include MDS 12 operating to receive media segments 14, which form a plurality of base services 16 or common channels, from a plurality of content providers 18. Further, for each of the plurality of base services 16, MDS 12 may include service attribute information 20 or common channel information, which defines and describes the corresponding base service. Additionally, MDS 12 receives custom attribute information 22 from each of a plurality of content retailers 24. Custom attribute information 22 may include content retailer-specific definitions and descriptions for each of the plurality of base services 16. MDS 12 is operable to generate a customized view of each base service 16 for each content retailer 24 by replacing service attribute information 20 with custom attribute information 22. These customized views of each base service 16 are defined as channels 26 or customized channels, which are content retailer-specific due to the customizations. The combination of service attribute information 20 and custom attribute information 22 thereby define customized channel attribute information 28 for each of the plurality of channels 26. Each content retailer 24 or billing and customer service provider (BCS) 30, jointly referred to as media retailer/provider 15, may then group various combinations of channels 26 into tiers 32, and various combinations of tiers 32 into packages 34 to offer, such as on a subscription basis, to devices associated with the given content retailer 24 and/or BCS 30, such as wireless device 36.

For example, each content retailer 24 and/or BCS 30 can provide a customized display of channels 26 on a user interface 38 of a subscribed wireless device 36 in the form of a media presentation guide ("MPG") 40. MPG 40 comprises a schedule of presentations 42 on each of the plurality of channels 26, where each presentation 42 comprises a form of media that may include one or more media segments 14. As noted above, however, the listing of channels 26 on MPG 40 may be based on having an existing subscription to the channel if the package subscription characteristic 117 associated with the channel 26 comprises a "closed" state. For example, in the case of a given package 34 having a "closed" subscription characteristic 117 and having a corresponding channel 27 that is not defined as a part of any "open" package, the associated channel may not be displayed on MPG 40. Generally, though, each channel 27 is associated with many packages 34, so even if a channel is associated with a closed package, it may also be associated with an open package, and thus may be displayed on MPG 40.

MPG 40, for example, may be constructed based on MPG information 70 (FIG. 3) carried by SI message 44. For instance, MPG information 70 may include media presentation guide title records and channel customization records associated with each presentation 42, 48, base service 16, auxiliary service 50, channel 26 and/or package 34. For example, SI message 44 may be sent within a flow 45 from MDS 12 to wireless device 36 via a wireless access network 46. Flow 45 is a logical stream within a "multiplex," which is a set of flows for a given area. Each flow 45 is typically used to deliver a single media component of a real-time presentation, or a file containing a non real-time presentation, or SI messages 44. Thus, each MPG 40 is customized on each device according to the associated content retailer 24 and/or BCS 30.

In other embodiments, the customized view may include presentation 42 from base service 16 in combination with an auxiliary presentation 48 from an auxiliary service 50 displayed on user interface 38. As noted above, however, the viewing of presentations 42 and/or 48 on the respective device may be based on having an existing subscription to the associated channel/presentation if the package subscription characteristic 117 associated with the given channel comprises a "closed" state. In any case, auxiliary presentation 48 and auxiliary service 50, for example, are provided to customize and enhance a base service.

Thus, system 10 comprises embodiments of a transport system that operates to create and transport multimedia content flows across data networks. For example, the transport system is suitable for use in transporting media from a content provider to a media distribution system for broadcast distribution. Advantageously, system 10 enables content retailers 22 and/or BCS providers 30 to define package subscription characteristics 117 to manage the introduction and phasing out of packages 26, and to control the viewing of any package-related information, such as in subscription menu 45, media presentation guide 40, and customized presentations 42 and 48 to devices having predetermined existing subscriptions.

Any number of devices may be operable with system 10 to receive and play/display content and content information. Wireless device 36 is one such device, and may include devices such as a cellular telephone, a personal digital assistant, a laptop computer, and any other wireless device operable to receive and play/display media. It should be noted, however, that in one or more embodiments of system 10, virtually any number or type of wired or wireless device capable of playing/displaying media may be utilized.

In FIGS. 1 and 2, the components of system 10 may each have a number of defined roles that allow certain functions to be separated from other functions. It should be noted, however, that in any given implementation of system 10, any given component or organization may perform multiple roles.

For example, BCS provider 30 comprises a business entity that provides the user billing and customer support services on behalf of one or more content retailers 24. Each device in system 10, such as wireless device 36, is associated with one BCS provider 30, such as through a subscription agreement 52. As such, BCS provider 30 may supply subscription data 54 to MDS 12.

Content retailer 24 comprises a business entity that defines packages 34 and offers them for subscription through one or more associated BCS providers 30. Accordingly, each content retailer 24 provides packages 34 and the associated packaged data to MDS 12. Further, for example, each content retailer 24 may be associated with one or more BCS providers 30 through a content retail agreement 56.

Although content retailer 24 and BCS provider 30 are represented as separate entities, it is contemplated that they may be combined into a single entity.

Content provider 18 may comprise a business entity that supplies content delivered to the user, such as device 36, through base services 16. For example, each content provider 18 supplies media segments 14 and the associated media data to MDS 12. Each media segment 14 may comprise one or more of video, audio, multimedia content, clips, real-time and non real-time content, scripts, programs, or any other type of suitable content. Further, for example, each content provider 18 may be associated with one or more content retailers 24 through a content retail agreement 58.

MDS 12 comprises any combination of wired and wireless networks, and associated computer devices and servers, which operates to distribute content for delivery to users. MDS 12 may comprise an optimized broadcast network designed and optimized to deliver high-quality content to selected devices over plurality of optimized communication channels. Further, for example, MDS 12 may comprise one or more content servers 60 that store the previously mentioned media, data and records, along with the logic and executable instructions to enable the functionality of MDS 12. For example, content server 60 and/or MDS 12 may include a system information (SI) message generator 62 having hardware and/or software, including memory, executable instructions and a processor, operable to generate SI message 44 based on the data within content server 60. For example, SI message generator 62 may include generator logic for compiling SI message 44 from the data within MDS 12, and transceiver logic for receiving all SI message-related data and sending SI message 44 out of MDS 12 for distribution to devices. Additionally, for example, MDS 12 may include wireless access network 46 having a broadcast base station (BBS) 64 that provides a transport interface to allow MDS 12 to deliver SI message 44 and content in the form of content flows to wireless access network 46 for broadcast/multicast to devices, such as wireless device 36.

Figure 3:
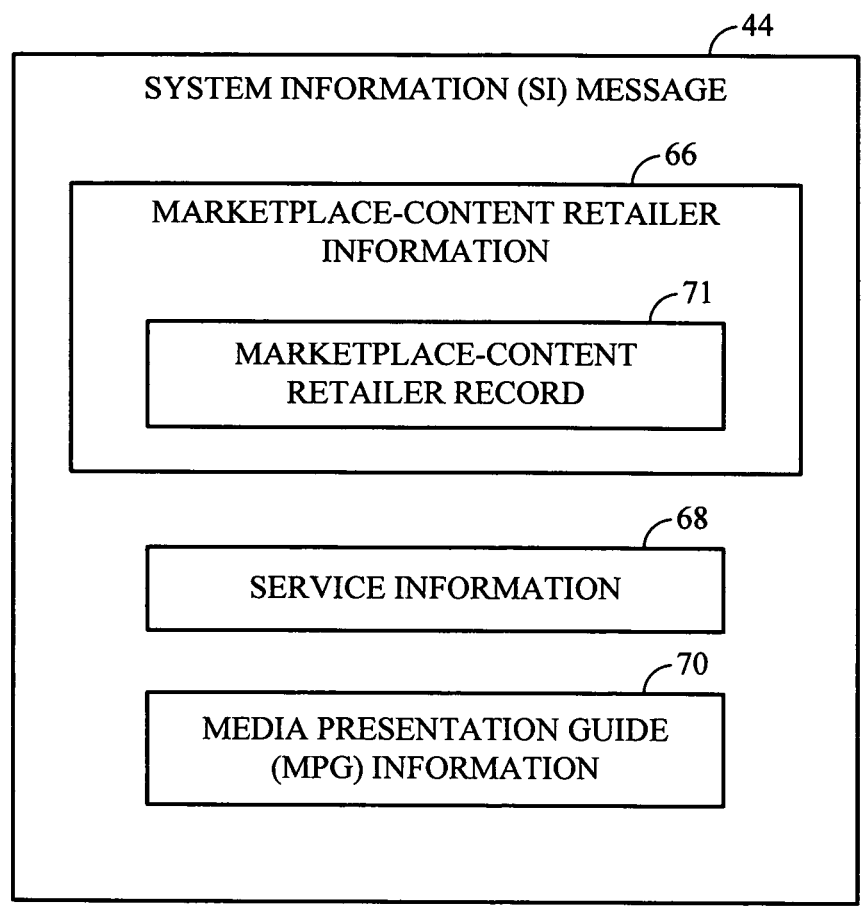
FIG. 3 is a schematic diagram of embodiments of a system information message of FIG. 1.

Referring to FIG. 3, SI message 44 comprises a set of information that enables a device to locate services or subscribe to packages on behalf of the user, and to describe marketplace information 66, service information 68 and MPG information 70 to the user. Marketplace information 66 may include information describing and/or defining each BCS provider 30, content retailer 24, package 34, tier 32, and channel 26. Service information 68 may include information, such as service attributes, definitions and records, for each base service 16 and auxiliary service 50 available in system 10. MPG information 70 may include information, such as attributes, definitions and records associated with MPG 40, relating to the contents of channels 26.

Figure 4:
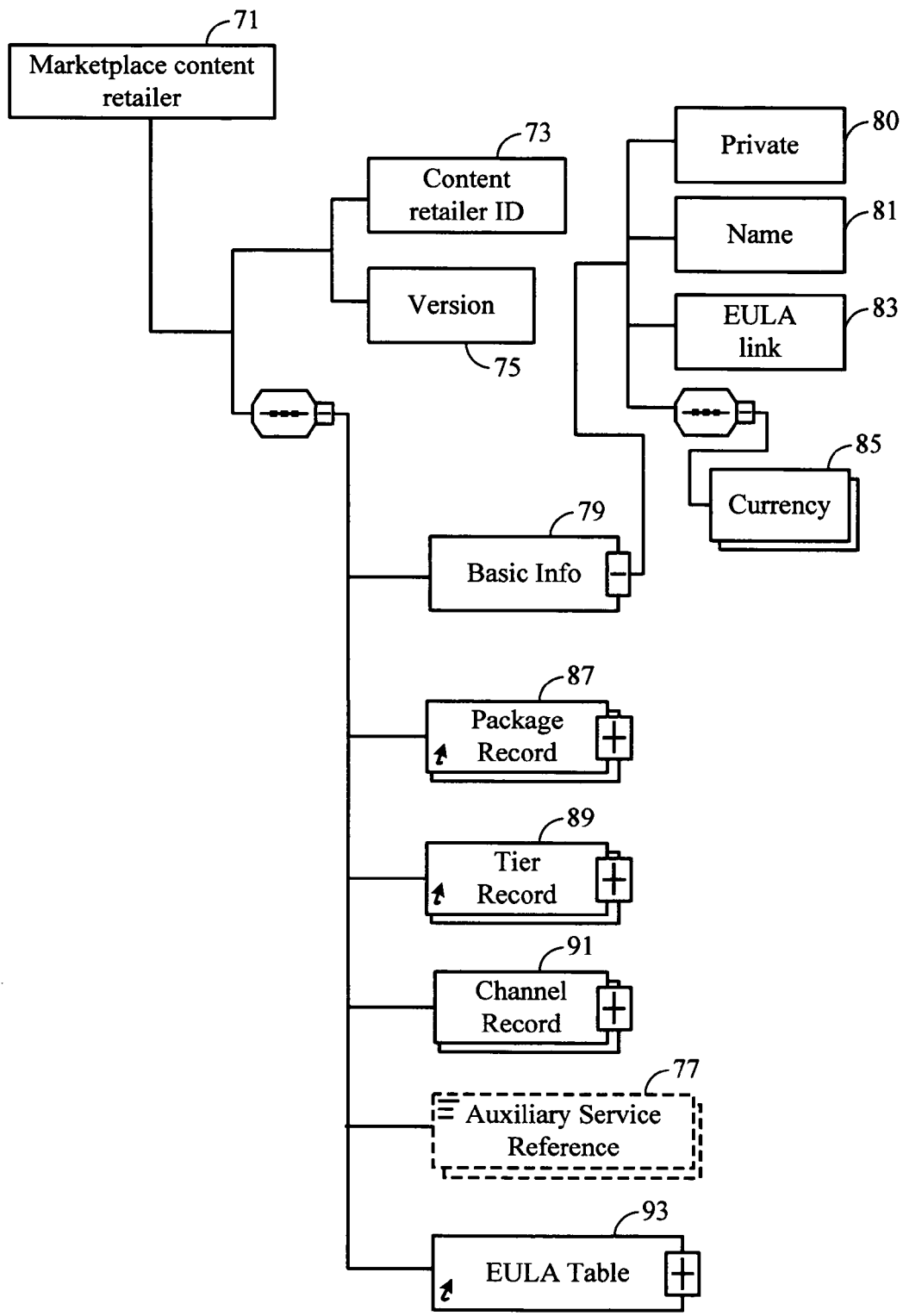
FIG. 4 is a schematic diagram of embodiments of a marketplace content retailer record associated with the system information message of FIG. 3.

Referring to FIG. 4, for example, embodiments of marketplace information 66 may include at least one marketplace content retailer record 71 associated with each content retailer 24, as identified by content retailer identification 73. Further, each record 71 may include a version identifier 75 for each content retailer identification 73. Version identifier 75 is associated with a given marketplace content retailer record 71 and identifies the particular set of attribute and element values transported by the marketplace content retailer record, thereby allowing it to be identified as a copy of another marketplace content retailer record. Version identifier 75 serves as an optimization mechanism. For example, a device already having a marketplace content retailer record 71, such as from a prior multicast, compares the version of the resident record with the version of the newly received record to see if the newly received record is a new version that has updated information. If the version does not indicate that the newly received record is an updated version, then the device does not need to waste resources and can skip the record. If the version indicates that the newly received record is an updated version, then the device can update its records.

Each marketplace content retailer record 71 provides information specific to a given content retailer 24. Notably, each marketplace content retailer record 71 may include one or more package records 87. Further, for example, each marketplace content retailer record 71 may include basic information 79, one or more tier records 89, one or more channel records 91, one or more auxiliary service references 77, and one or more EULA tables 93 associated with the respective content retailer 24.

For example, basic information 79 may include data such as a private content retailer indicator 80, a name 81 associated with the given content retailer and an End User License Agreement (EULA) link 83, which provides a reference to a EULA database. For example, private content retailer indicator 80 specifies if the given content retailer is a private content retailer, where information about a private content retailer and its associated packages, etc. is only available to predetermined users, and only those user subscribed to packages offered by a private content retailer may view the associated information. For example, without limitation, a private content retailer may be an enterprise or associated with an enterprise, such as a company, that utilizes it associated packages for private communications to employees of the company. Further, for example, EULA link 83 may be a universal resource identifier (URI). Additionally, each marketplace content retailer record 71 may include an identification of one or more currencies 85 supported by the respective content retailer.

In some embodiments, each tier record 89 has a unique tier identifier and one or more channel references that define the given set of channels 26 associated with the tier. Further, each tier record 89 may also include one or more auxiliary service references to define auxiliary services for use on the channels of the tier.

In some embodiments, each channel record 91 defines the various attributes associated with each channel 26 associated with the content retailer record 71. For example, each channel record 91 may include: a channel identifier; a channel validity time; a channel weight; one or more channel language specific data; a base service associated with the channel; an auxiliary service reference; and a channel icon.

In some embodiments, each auxiliary service reference 77 may define a given auxiliary service record to associate with the marketplace content retailer record 71. For example, each auxiliary service record may include: an auxiliary service identifier; a validity time; an auxiliary flow record; and auxiliary capability requirements.

Figure 5:
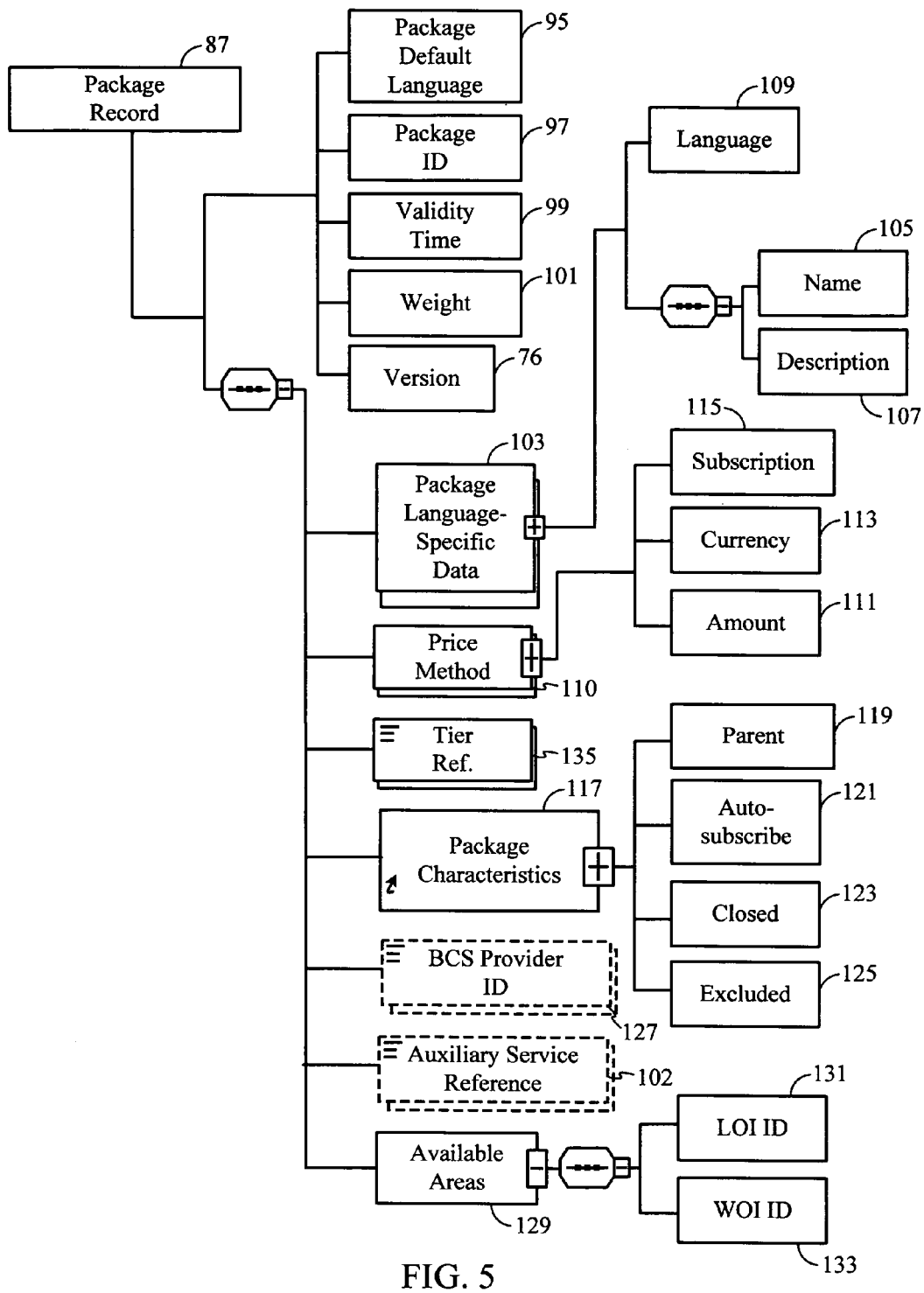
FIG. 5 is a schematic diagram of embodiments of a package record associated with the marketplace content retailer record of FIG. 4.

Referring to FIGS. 4 and 5, each package record 87 provides information on: packages 34 offered by the respective content retailer; subscription options for each package 34; and a set of tiers 32 that make up the given package 34. For example, each package record 87 may include attributes such as: a package default language 95 that identifies a default language to be used for services 16 in the respective package if the device user's preferred language is not available; a unique package identifier 97 that distinguishes the package from all other packages offered by the same content retailer; a validity time 99 that defines a time at which the definition provided in the respective package record becomes valid, superseding the previous definition; a package weight 101 which is a value used by device 36 to determine the order in which the packages are presented to the user, for example, a package with a lower weight than another package is presented first, and the package weight for a given package may be a unique value among all content retailers; and version identifier 76, which serves the same purpose for package record as version identifier 75 (FIG. 4) serves for market content retailer record 71.

Notably, each package record 87 may include package characteristics 117, which may, for example, identify the given package as one or more of a parent package 119, an autosubscribe package 121, a closed package 123 or an excluded package 125. Parent package 119 comprises a base or root package that serves as the lowest level of subscription. For example, if a given package is associated with a parent package 119, then the package may be considered an "add-on" package, where the user may only subscribe to the package if the user is already subscribed to at least one associated parent package. Further, if the given package is an autosubscribe package 121, then the package may be considered automatically part of another package, and a user is automatically subscribed to the given package when they subscribe to the other package. Additionally, if the given package is a closed package 123, then new subscriptions are no longer being accepted for the given package and the viewability of the package information is restricted to existing subscribers, as described in detail above. Alternatively, if the given package is an excluded package 125, then a given user is not permitted to subscribe to the package. For example, a subscription to a given parent package may cause any other parent packages to be listed as excluded packages. Thus, in general in some instances, all parent packages are mutually exclusive from one another.

In further examples, a package record 87 may include package characteristic 117 that combines a closed state and an excluded package so that only one user sees one version of a given package. For example, an original package is changed to the closed state, and a new package is created, where the new package is a modified version of the original package. In this scenario, it may be desirable to only show the original package to subscribers of the original package, and exclude these subscribers from seeing the new package, even though the new package is in the open state and is accepting new subscribers. Such a scenario may be desirable in order to eliminate consumer confusion when the original package and the new package have the same or similar names and/or services.

Additionally, each package record 87 further may include one or more package language specific data 103, including a package name 105 and a package description 107 associated with one or more specified languages 109. For example, package name 105 may be the information utilized to present the name of the package in subscription menu 45 (FIG. 1). Further, each package record 87 may include one or more package price methods 110, which specifies an amount or cost 111 of the package, in a given currency 113, associated with a given subscription method 115, such as monthly, weekly, etc.

Further, each package record 87 may include one or more package price methods 109, which specifies an amount or cost 111 of the package, in a given currency 113, associated with a given subscription method 115, such as monthly, weekly, etc.

Additionally, each package record 87 further may include one or more tier references 135, which each identify a tier record associated with the given package. Each tier record may include a unique tier identifier that distinguishes the tier from all other tiers from the content retailer, and a validity time, which defines a time at which the definition provided in the given tier record becomes valid, superseding the previous definition.

Further, each package record 87 may include one or more BCS provider identifiers 127, which specify a list of BCS providers associated with the given package.

Each package record 87 may include one or more auxiliary service references 102. At this level, auxiliary service reference 102 dictates a specific auxiliary service 50 and/or a specific auxiliary presentation 48 for acquisition while accessing any tiers 32, channels 26 and/or base services 16 associated with the given package. It should be noted, however, that the corresponding records for each tier 32, channel 26 and/or base service 16 may also include an auxiliary service reference that is specific to that tier 32, channel 26 and/or base service 16. For example, the auxiliary service reference within the record of each tier 32, channel 26 and/or base service 16 overrides auxiliary service reference 102 in package record 87. In further examples, auxiliary service reference 102 in package record 87 overrides an auxiliary service reference within the record of each tier 32, channel 26 and/or base service 16.

Also, each package record 87 may include data on an available area 129 associated with where the given package is available. For example, available area 129 may include one or more local-area grouping of infrastructure (LOI) identifiers 131 and/or one or more wide-area grouping of infrastructure (WOI) identifiers 133. Each LOI identifier 131 identifies a logical grouping of the infrastructure deployed to provide MDS 12 with network coverage in a specific local area. Similarly, each WOI identifier 133 identifies a logical grouping of the infrastructure deployed to provide MDS 12 with network coverage in a specific wide area.

Figure 6:
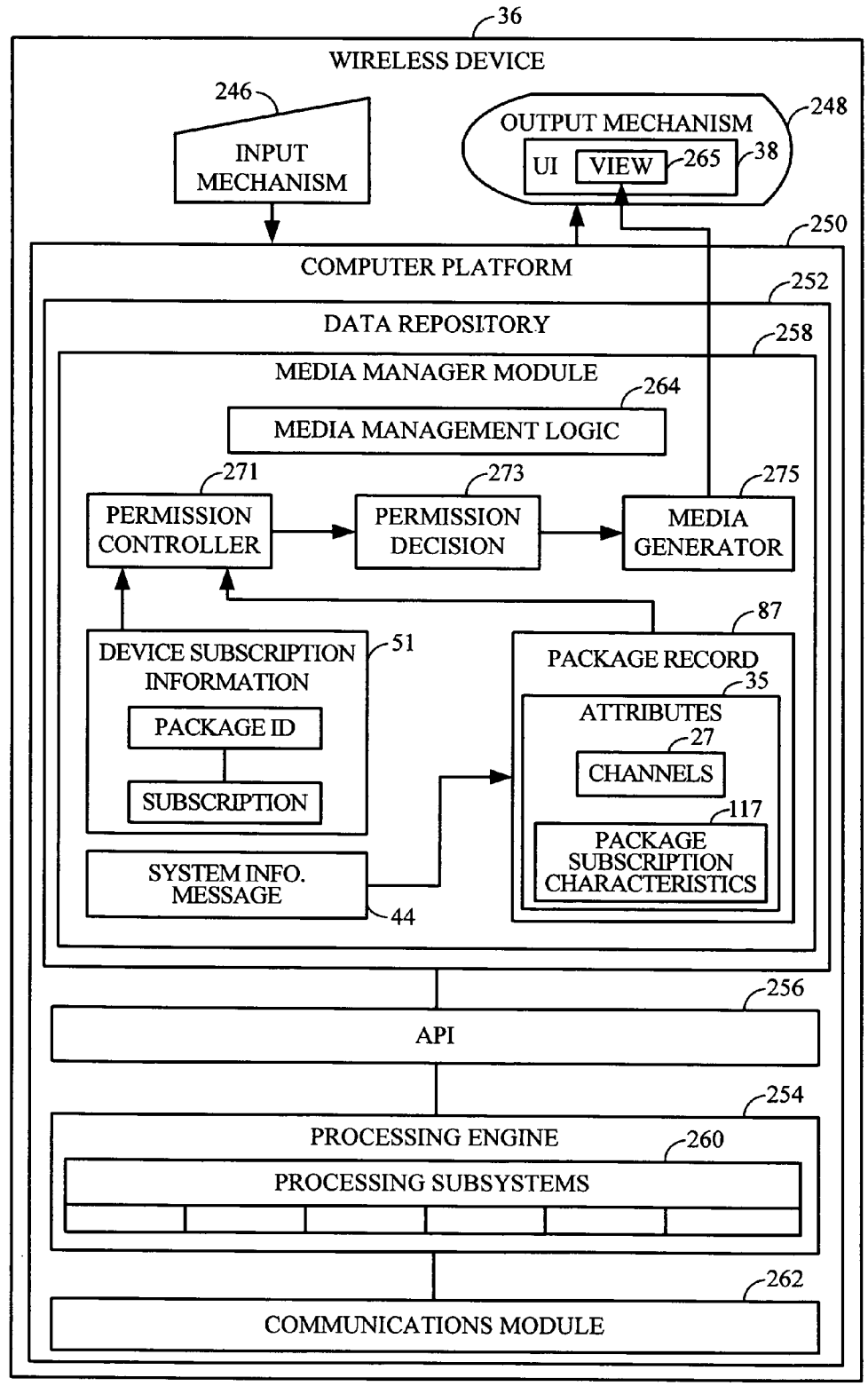
FIG. 6 is a schematic diagram of embodiments of an architecture of the wireless device of FIG. 1.

Referring to FIG. 6, wireless device 36 has input mechanism 246 for generating inputs into wireless device, and output mechanism 248 for generating information for consumption by the user of the wireless device. For example, input mechanism 246 may include a mechanism such as a key or keyboard, a mouse, a touch-screen display, voice recognition module, etc. Further, for example, output mechanism 248 may include user interface 38, which may be a display, an audio speaker, a haptic feedback mechanism, etc.

Further, wireless device 36 has computer platform 250 that can transmit data across wireless network 46, and that can receive and execute software applications and display data transmitted from MDS 12 or another computer device connected to wireless network 46. Computer platform 250 may include a data repository 252, which may comprise volatile and nonvolatile memory such as read-only and/or random-access memory (RAM and ROM), EPROM, EEPROM, flash cards, or any memory common to computer platforms. Further, data repository 252 may include one or more flash memory cells, or may be any secondary or tertiary storage device, such as magnetic media, optical media, tape, or soft or hard disk.

Further, computer platform 250 also may include a processing engine 254, which may be an application-specific integrated circuit ("ASIC"), or other chipset, processor, logic circuit, or other data processing device. Processing engine 254 or other processor such as ASIC may execute an application programming interface ("API") layer 256 that interfaces with any resident programs, such as a media manager module 258 (discussed below), in data repository 252 of the wireless device. API 256 is a runtime environment executing on the respective wireless device. One such runtime environment is Binary Runtime Environment for Wireless® (BREW®) software developed by Qualcomm, Inc., of San Diego, Calif. Other runtime environments may be utilized that, for example, operate to control the execution of applications on wireless computing devices.

Processing engine 254 may include various processing subsystems 260 embodied in hardware, firmware, software, and combinations thereof, that enable the functionality of wireless device 36 and the operability of the wireless device on wireless access network 46. For example, processing subsystems 260 allow for initiating and maintaining communications, exchanging data, and executing multimedia presentations. In certain embodiments, such as in a wireless communication device, processing engine 254 may include one or a combination of processing subsystems 260, such as: sound, non-volatile memory, file system, transmit, receive, searcher, layer 1, layer 2, layer 3, main control, remote procedure, handset, power management, diagnostic, digital signal processor, vocoder, messaging, call manager, Bluetooth® system, Bluetooth® LPOS, position determination, position engine, user interface, sleep, data services, security, authentication, USIM/SIM, voice services, graphics, USB, multimedia such as MPEG, GPRS, etc. For the disclosed embodiments, processing subsystems 260 of processing engine 256 may include any subsystem components that interact with applications executing on computer platform 250. For example, processing subsystems 260 may include any subsystem components which receive data reads and data writes from API 256 on behalf of media manager module 258.

Computer platform 250 may further include a communications module 262 embodied in hardware, firmware, software, and combinations thereof, that enables communications among the various components of the wireless device 36, as well as between wireless device 36 and wireless access network 46. For example, communications module 262 may include a transceiver module for wireless communications with MDS 12 and/or wireless access network 46.

Media manager module 258 operates to manage media subscription, media receipts, and media playing/viewing activities on wireless device 36. Media manager module 258 may include any hardware, software, firmware and/or other set of executable instructions operable to manage the media-related activities on wireless device 36. Further, media manager module 258 and/or data repository 252 store SI message 44 and its associated content information and the content for viewing/playing on user interface 38. In some embodiments, media manager module 258 may include media management logic 264 that provides the capability to receive, store, provide access to and play/display media-related information on wireless device 36. For example, media management logic 264 operates to parse package record 87 from SI message 44 to determine package subscription information, such as package subscription characteristic 117, in order to control the display of package-related information on the device, including displaying package-related information in MPG 40 on user interface 38 and/or providing a view 265 of a channel 26, including presenting real-time and non-real-time content. Similarly, media management logic 264 operates to manage subscriptions to packages 34 with content retailers 24 and/or BCS providers 30. For example, media management logic 264 may generate and send to MDS 12 (FIG. 1) a subscription request, for example based on a user selection from a list of available packages, to subscribe to a given package. Further, media management logic 264 operates to manage the acquisition and storage, including memory management functions, associated with a non real-time presentation based on the respective contact window, as well as managing the playing/displaying of the content. Additionally, media management logic 264 operates with communications module 262 to receive and play real-time presentations and datacast presentations.

In some embodiments, for example, media manager module 258 may include a permission controller 271 that determines a permission decision 273 regarding whether or not the device is permitted to subscribe to and/or display package-related information. Permission controller 271 may include any hardware, software, firmware and/or other set of executable instructions operable to manage the activities associated with determining access to package-related information on wireless device 36. As noted above, for example, permission controller 271 checks package subscription characteristic 117. If the characteristic 117 indicates a "closed" package, then permission controller 271 checks device subscription information 51 to determine if the device has an existing subscription to the package. If no existing package subscription exists, then permission controller 271 generates a "negative" permission decision 273 in association with the given package and the associated package information and package records 87. On the other hand, if there is an existing package subscription, then permission controller 271 generates a "positive" permission decision 273 in association with the given package and the associated package information and package records 87.

Media generator 275 receives permission decision 273, and generates view 265 on user interface 38 based on the value of permission decision 273. For example, media generator 275 only generates information associated with a given package record 87 having a "closed" package subscription characteristic 117 if a "positive" permission decision 273 has been received in association with the given package. Media generator 275 may include any hardware, software, firmware and/or other set of executable instructions operable to manage the activities associated with generating media associated with a given package on wireless device 36.

Figure 7:
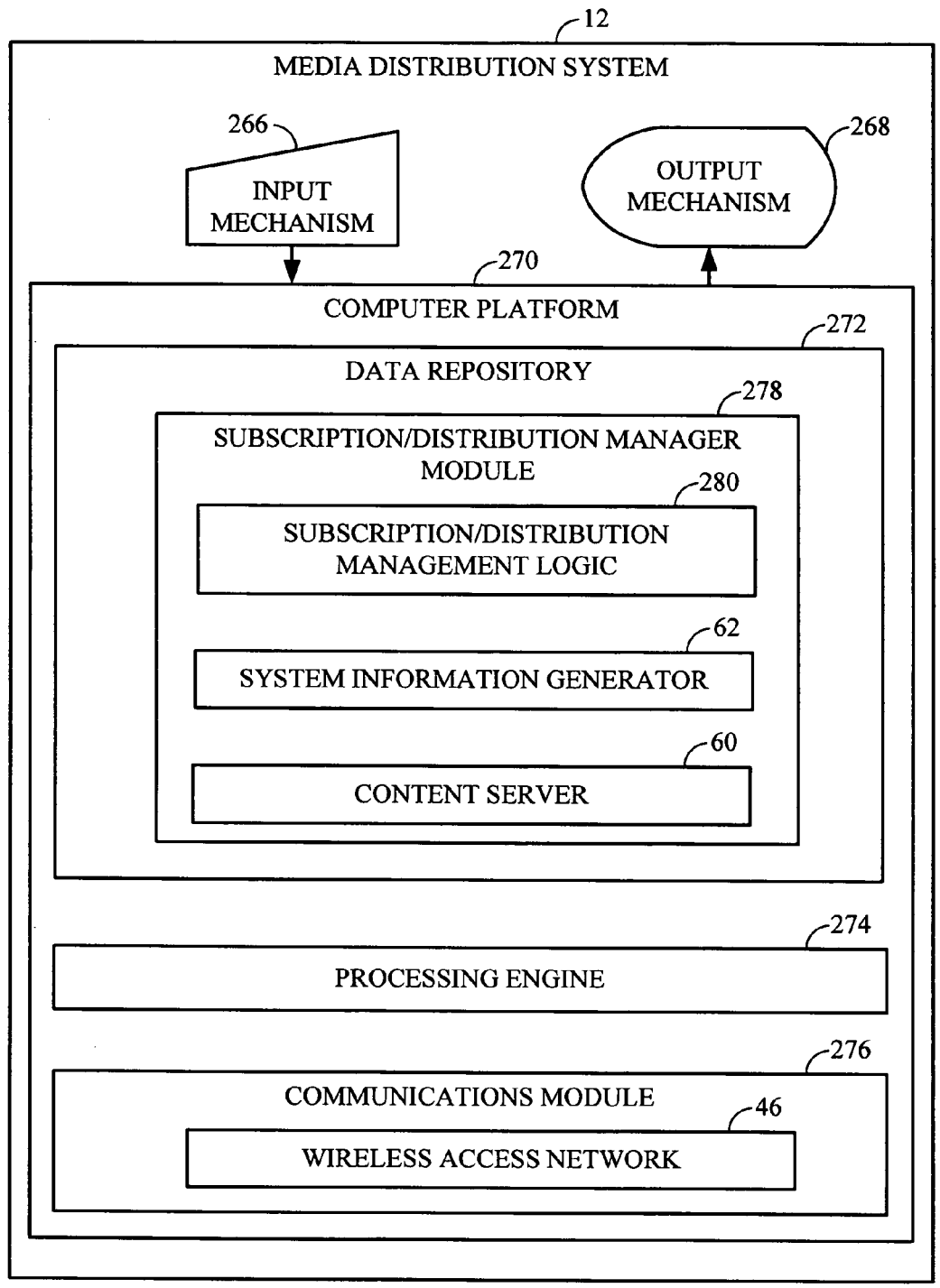
FIG. 7 is a schematic diagram of embodiments of an architecture of the media distribution system of FIG. 1.

Referring to FIG. 7, MDS 12 may comprise at least one of any type of hardware, software, firmware, server, personal computer, mini computer, mainframe computer, or any computing device either special purpose or general computing device. Further, there can be separate servers or computer devices and/or networks associated with MDS 12 that work in concert to receive, manipulate and provide data in usable formats to parties, and/or to provide a separate layer of control in the data flow between devices and networks and MDS 12.

MDS 12 has input mechanism 266 for generating inputs into MDS 12, and output mechanism 268 for generating information for consumption by an operator of MDS 12. For example, input mechanism 266 may include a mechanism such as a key or keyboard, a mouse, a touch-screen display, voice recognition module, etc. Further, for example, output mechanism 268 may be a display, an audio speaker, a haptic feedback mechanism, etc. Additionally, input mechanism 266 may be a remote device, such as a remote computer or workstation, which has access to MDS 12. In some embodiments, for example, input mechanism 266 may be utilized by an operator to enter package subscription characteristic 117, and for establishing and/or manipulating any other information associated with presentations 42, 48, channels 26, tiers 32 and packages 34.

Further, MDS 12 has one or a plurality of resident or distributed computer platforms 270 that can receive and transmit data, and that can receive and execute software applications and display data. Computer platform 270 may include a data repository 272, which may comprise volatile and non-volatile memory such as read-only and/or random-access memory (RAM and ROM), EPROM, EEPROM, flash cards, or any memory common to computer platforms. Further, data repository 272 may include one or more flash memory cells, or may be any secondary or tertiary storage device, such as magnetic media, optical media, tape, or soft or hard disk. In some embodiments, for example, data repository 272 may include the one or more content servers 60.

Further, computer platform 270 also may include a processing engine 274, which may be an application-specific integrated circuit ("ASIC"), or other chipset, processor, logic circuit, or other data processing device for carrying out executable instructions.

Computer platform 270 may further include a communications module 276 embodied in hardware, firmware, software, and combinations thereof, that enables communications among the various components of MDS 12, as well as between MDS 12 and wireless device 36. For example, communications module 276 may include wireless access network 46. Further, for example, communications module 276 may include a transceiver module for wireless communications with wireless device 36 and/or wireless access network 46.

Further, a subscription/distribution manager module 278 resides on computer platform 270 which operates to manage all of the media distribution functions described herein performed by MDS 12. Subscription/distribution manager module 278 may include any hardware, processors, software, firmware, and/or other set of executable instructions operable to manage the media-related activities on MDS 12. Further, in some embodiments, subscription/distribution manager module 278 may include subscription/distribution management logic 280 that provides MDS 12 with the capability to receive, store, manipulate, provide access to and distribute subscriptions, content and content-related information. For example, subscription/distribution management logic 280 operates to receive content and content-related information, as well as content retailer-specific information, such as customization information, auxiliary services, auxiliary presentations, channel information, tier information and package information. Further, subscription/distribution management logic 280 is operable to receive, process and transmit subscription related information, such as subscription requests, the corresponding approvals or denials, and the management of digital rights based on an approved subscription request. In some embodiments, for example, subscription/distribution management logic 280 may receive a subscription request for a package having a "closed" subscription characteristic, and then generate a message denying the subscription request based on the package subscription characteristic. Further, subscription/distribution manager module 278 may include SI generator 62, discussed above.

Figure 8:
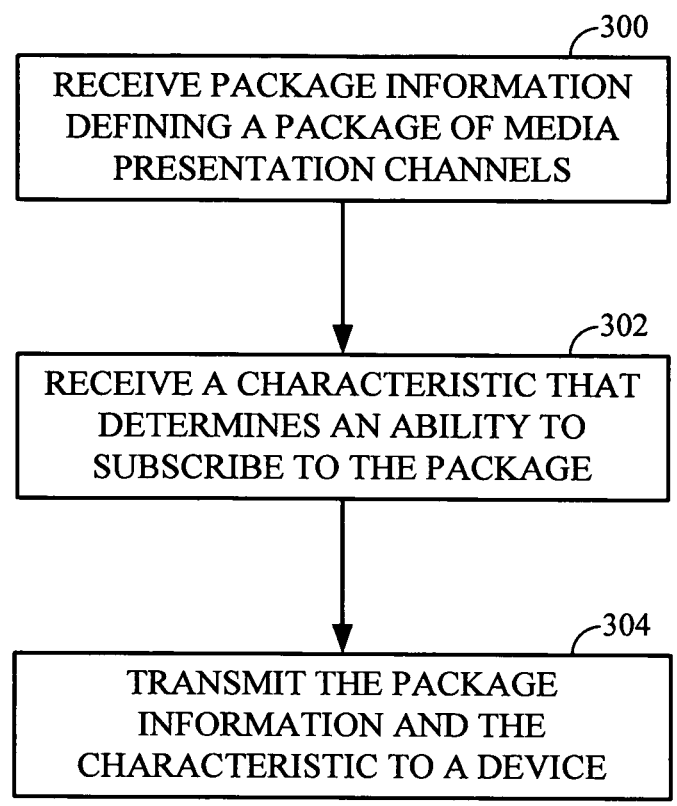
FIG. 8 is a flowchart of embodiments of a method for providing media programming information.

In operation, referring to FIG. 8, embodiments of a method of providing media program information comprise providing package information defining a package of media presentation channels (Block 300). For example, in some embodiments, MDS 12 receives package attributes 35 and/or package records 87 from media retailer/provider 15 for each one of a plurality of media programming packages 34 offered for subscription by the media retailer/provider.

Some embodiments of the method further may include providing a characteristic that determines an accessibility of the package information for presentation on a device (Block 302). For example, in some embodiments, MDS 12 receives package subscription characteristic 117 from media retailer/provider 15 for each one of a plurality of media programming packages 34 offered for subscription by the media retailer/provider. Package subscription characteristic 117 may define a "closed" state, for example, which restricts the presentation of information related to the given package to devices having an existing subscription to the given package.

Additionally, some embodiments of the method further may include transmitting the package information and the characteristic to the device (Block 304). For example, in some embodiments, MDS 12, via system information generator 62 and transmit subsystem 17, gathers the package information into system information message 44 and transmit system information message 44 to devices capable of playing multimedia presentations, such as wireless device 36.

Figure 9:
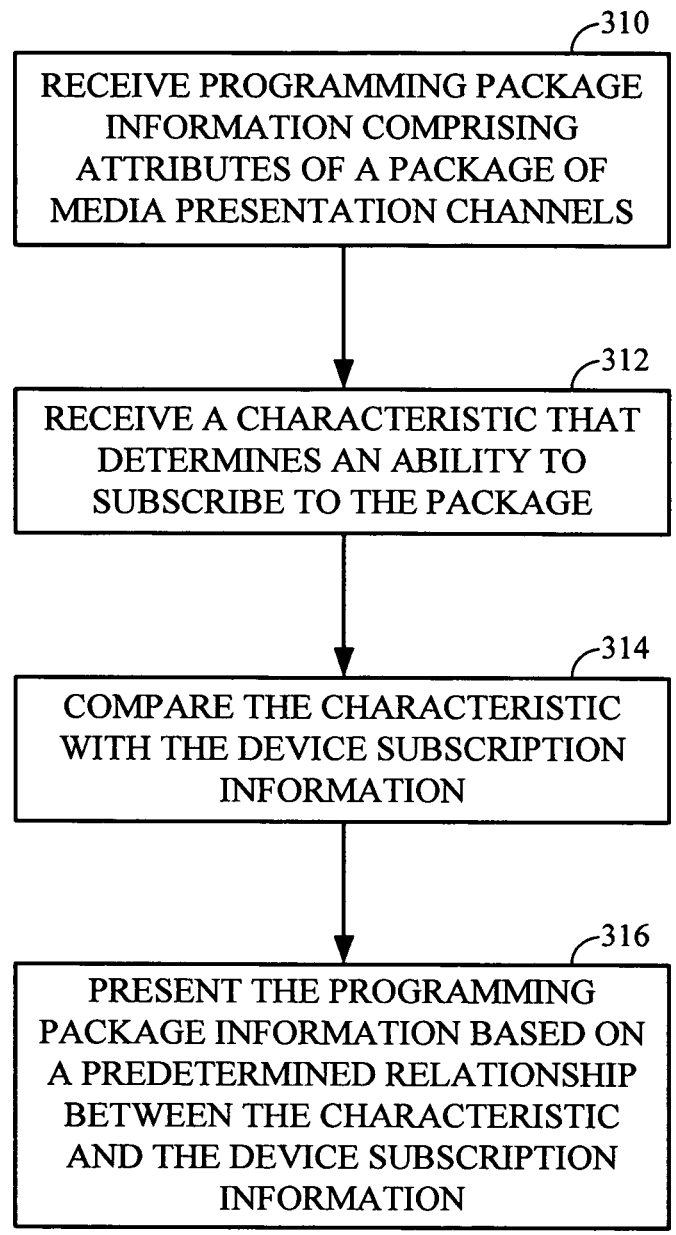
FIG. 9 is a flowchart of embodiments of a method for receiving media programming information.

In some embodiments, referring to FIG. 9, a method of receiving media programming information comprises receiving programming package information comprising attributes of a package of media presentation channels (Block 310). For example, in some embodiments, wireless device 36 and/or media manager module 258 receives system information message 44 from MDS 12. System information message 44 may include package records 87 associated with each package 34 offered for subscription by media retailer/provider 15.

These embodiments of the method further may include receiving a subscription characteristic that determines an accessibility of the programming package information (Block 312). For example, in some embodiments, wireless device 36 and/or media manager module 258 receives package subscription characteristic 117 from MDS 12. For instance, package subscription characteristic 117 may be a portion of package records 87 within system information message 44 received from MDS 12.

These embodiments of the method further may include comparing the subscription characteristic with device subscription information associated with a device (Block 314). For example, in some embodiments, media manager module 258 and/or permission controller 271 retrieve package subscription characteristic 117. If characteristic 117 indicates a "closed" package, then media manager module 258 and/or permission controller 271 checks device subscription information 51 to determine if the device has an existing subscription to the package. If no existing package subscription exists, then permission controller 271 generates a "negative" permission decision 273 in association with the given package and the associated package information and package records 87. On the other hand, if there is an existing package subscription, then permission controller 271 generates a "positive" permission decision 273 in association with the given package and the associated package information and package records 87.

Additionally, these embodiments of the method further may include presenting the programming package information on the device based on a predetermined relationship between the subscription characteristic and the device subscription information (Block 316). For example, in some embodiments, media manager module 258 and/or media generator 275 review a given permission decision 273 associated with a given package record 87 and generates view 265 on user interface 38 based on the value of permission decision 273. For example, media generator 275 only generates information associated with a given package record 87 having a "closed" package subscription characteristic 117 if a "positive" permission decision 273 has been received in association with the given package.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the foregoing disclosure shows illustrative embodiments, it should be noted that various changes and modifications could be made herein without departing from the scope of the described embodiments as defined by the appended claims. Furthermore, although elements of the described embodiments may be described or claimed in the singular, the plural is contemplated unless limitation to the singular is explicitly stated.

What is claimed is:

1. A method of providing media program information, comprising:
    providing package information describing a package of media presentations associated with a billing and customer service (BCS) provider and an indication of whether the package has an OPEN or CLOSED state, the OPEN state indicating that the package is open for additional subscriptions regardless of a subscriber's device type, and the CLOSED state indicating that the package is closed to additional subscriptions regardless of the subscriber's device type but that the media presentations of the package are provided to devices that are associated with the BCS provider through a subscription agreement regardless of a type of the devices; and
    transmitting the package information and the indication of whether the package has the OPEN or CLOSED state to one of the devices that is associated with the BCS provider through the subscription agreement, wherein the one of the devices is configured to display the media presentations of the package.

2. At least one processor configured to perform the actions of:
    providing package information describing a package of media presentations and an indication of whether the package has an OPEN or CLOSED state, the OPEN state indicating that the package is open for additional subscriptions, and the CLOSED state indicating that the package is closed to additional subscriptions but that the media presentations of the package are available to existing subscribers to the package and
    transmitting the package information and the indication of whether the package has the OPEN or CLOSED state to a device configured to display the media presentations of the package.

3. A computer program resident in a non-transitory computer readable medium that, when executed, directs a computer device to perform the actions of: providing package information describing a package of media presentations associated with a media provider and an indication of whether the package has an OPEN or CLOSED state, an OPEN state indicating that a package is open for additional subscriptions regardless of a subscriber's device type and for which information may be displayed to all devices, and a the CLOSED state indicating that the a-package is closed to new subscribers but that the media presentations of the package are available to devices that are associated with the media provider through a subscription agreement; and additional subscriptions regardless of the subscriber device type but for which existing subscriber may have information displayed regardless of the subscriber's device type; and transmitting the definition of the package information and the indication of whether the package has the OPEN or CLOSED state to a device one of the devices that is associated with the media provider through the subscription agreement, wherein the one of the devices is configured to display the media presentations of the package.

4. An apparatus for providing media program information, comprising:
    means for providing package information describing a package of media presentations and an indication of whether the package of media presentations has a CLOSED state, the CLOSED state indicating that the package of media presentations is closed to new subscribers but that the media presentations of the package are available to existing subscribers to the package; and
    means for transmitting the the package information and the indication of whether the package has the CLOSED state to a device configured to display the media presentations of the package.

5. An apparatus for providing media program information, comprising:
    a content server including package information defining a package of media presentations associated with a retailer, the package information comprising an indication of whether the package has an OPEN or CLOSED state, the OPEN state indicating that the package is open for additional subscriptions regardless of a subscriber's device type, and the CLOSED state indicating that a package is closed to additional subscriptions but that the media presentations of the package are provided to devices that are associated with the retailer through a subscription agreement regardless of a type of the devices;
    a generator operable to generate a message for transmission to one of the devices associated with the retailer through a subscription agreement, the message comprising the package information; and
    a transmit subsystem operable to transmit the message comprising the package information including the indication of whether the package has the OPEN or CLOSED state to the one of the devices associated with the retailer through the subscription agreement.

6. A method of providing one or more packages of media programming, the method comprising:
    providing information describing a first programming package of media presentations that is open for new subscriptions to a plurality of devices regardless of a type of the devices;
    providing information describing a second programming package of media presentations that has been closed to new subscriptions;

permitting a subscription to the first programming package to any of the plurality of devices such that the media presentations of the first programming package are available to any of the plurality of devices; and substantially concurrently permitting a presentation of the media presentations of the second programming package only to those of the plurality of devices that are currently subscribed to the second programming package, wherein subscribers not currently subscribed to the second programming package are prohibited from subscribing to the second programming package so as to prevent additional subscriptions to the second programming package.

7. At least one processor configured to perform the actions of:

providing information describing a first programming package of media presentations;

providing information describing a second programming package of media presentations;

permitting a presentation of the media presentations of the first package and the media presentations of the second package for a first subscriber having a subscription to the first programming package and the second programming package; and permitting a presentation of the media presentations of the first package and prohibiting presentation of the media presentations of the second package for a second subscriber having a subscription to the first package but not to the second package, wherein the second subscriber is prohibited from requesting a subscription to the second package.

8. A computer program resident in a non-transitory computer readable medium that, when executed, directs a computer device to perform the actions of:

providing information describing a first programming package of media presentations; providing information describing a second programming package of media presentations; permitting a presentation of the media presentations of information describing both the first package and the second package for a first subscriber having a subscription to both the first programming package and the second programming package; and permitting a presentation of the media presentations of information describing the first package and prohibiting a presentation of the media presentations of information describing the second package for a second subscriber having a subscription to the first package but not to the second package, wherein the second subscriber is prohibited from requesting a subscription to the information describing the second package.

9. An apparatus for providing media program information, comprising:

a means for providing information describing a first programming package of media presentations;

a means for providing information describing a second programming package of media presentations;

a means for permitting a presentation of the media presentations of both the first package and the second package for a first subscriber having a subscription to both the first programming package and the second programming package; and a means for permitting a presentation of the media presentations of the first package and for prohibiting a presentation of the media presentations of the second package for a second subscriber having a subscription to the first package but not to the second package, wherein the second subscriber is prohibited from requesting a subscription to the second package.

10. An apparatus for providing media program information, comprising:

a content server comprising a first set of package information describing a first media programming package of media presentations having a first subscription characteristic, the content server further comprising a second set of package information describing a second media programming package of media presentations having a second subscription characteristic, wherein the second programming package is different from the first programming package, and wherein at least one of the first subscription characteristic and the second subscription characteristic is operable to permit a presentation of the media presentations of the corresponding programming package only on a device having a current subscription to the corresponding programming package while prohibiting any new subscriptions to the corresponding package regardless of device type; and a generator operable to generate a message for transmission across a network, the message comprising the first set of package information, the second set of package information, the first subscription characteristic and the second subscription characteristic, the message enabling the presentation of the media presentations of the first and second programming packages only on those devices having a current subscription to the corresponding package regardless of device type, wherein devices not having the current subscription to the corresponding package are prohibited from requesting a subscription to the corresponding package.

11. The apparatus of claim 10, further comprising a subscription manager module operable to receive a request for a subscription to the programming package having a subscription characteristic operable to prohibit any new subscriptions, the subscription manager module further operable to generate a denial of the subscription request based on the subscription characteristic.

12. A method of receiving media programming information on a device, comprising:

receiving, on a device, programming package information describing a package of media presentation channels;

receiving, on the device, an indication of whether a subscription to the package of media presentation channels is OPEN or CLOSED to additional subscribers, wherein the device is configured to present the media presentations of the package;

allowing a request to subscribe to the package for the package being indicated as OPEN to additional subscribers; and presenting one of the media presentation channels of the programming package on the device for the programming package being indicated as being CLOSED to additional subscribers and the device being already subscribed to the programming package regardless of a subscriber's device type.

13. The method of claim 12, wherein presenting further comprises displaying the package in a list of packages available for subscription.

14. The method of claim 12, wherein presenting further comprises displaying at least one channel associated with the package in a media presentation guide.

15. The method of claim 12, wherein the device has a subscription to the package and the presenting further comprises displaying a presentation associated with the package.

16. An apparatus for receiving media program information, comprising:
- a computer platform operable to present media content;
- a data repository comprising programming package information for at least one package and device subscription information indicating the packages to which the device is currently subscribed, the programming package information describing a package of channels including a subscription characteristic that indicates whether the programming package is open for additional subscriptions regardless of subscriber device type; and
- a media manager module that determines if the channels of a package may be displayed based on states of the subscription characteristic of the package and the device subscription information regardless of subscriber device type, the media manager module operable to initiate presentation of one of the channels of the package on the device based on the package permission decision regardless of subscriber device type, and the media manager operable to prohibit requests for subscribing to the programming package when the media manager module determines that the package is not open to additional subscriptions.

17. The apparatus of claim 16, wherein the predetermined relationship comprises the subscription characteristic having a closed state and the device subscription information indicating an existing subscription to the package.

18. The apparatus of claim 16, wherein the predetermined relationship comprises the subscription characteristic indicating that the package is open to new subscriptions.

19. The apparatus of claim 16, wherein the subscription characteristic comprises one of a first state or a second state, wherein the first state indicates that the package is closed to new subscriptions and has a limited permission to present the programming package information and the second state indicates an unlimited ability to subscribe to and present the programming information.

20. The apparatus of claim 19, further comprising:
- a permission controller that generates a permission decision that allows the media manager module to present the package information when the subscription characteristic comprises the first state and the device subscription information indicates an existing subscription to the programming package.

21. The apparatus of claim 19, wherein the permission controller generates a permission decision that prohibits the media manager module from requesting a subscription to the package, and which prohibits the media manager module from presenting the package information, when the subscription characteristic comprises the first state and the device subscription information indicates a lack of a subscription to the programming package.

22. The apparatus of claim 19, wherein the permission controller generates a permission decision that allows the media manager module to present the package information when the subscription characteristic comprises the second state.

23. The apparatus of claim 16, wherein the media manager module is operable to initiate a view of the package in a list packages available for subscription.

24. The apparatus of claim 16, wherein the media manager module is operable to initiate a view of at least one channel associated with the package in a media presentation guide.

25. The apparatus of claim 16, wherein the media manager module is operable to initiate generating a view of a presentation associated with the package.

26. A method of providing package information, comprising:
- providing package information relating to a package of media presentations,
- providing a first package subscription information that indicates whether the package of media presentations is associated with a closed state, the closed state indicating that the package of media presentations is closed to new subscribers to the package but that the media presentations of the package are available to existing subscribers to the package; and
- transmitting the package information and the first package subscription information to a device configured to display the media presentations of the package.

27. The method of claim 26, further comprising:
- providing a second package subscription information that is used to determine whether the device can present one of the media presentations of the package of media presentations; and
- transmitting the second package subscription information to the device with the package information and the first package subscription information.

28. The method of claim 27, wherein the second package subscription information is used to determine whether the device can present all of the media presentations of the package of media presentations.

29. The method of claim 27, wherein the first package subscription information indicates that the package of media presentations is associated with the closed state, further comprising:
- presenting the one of the media presentations of the package of media presentations on the device, wherein information stored on the device corresponds to the second package subscription information.

30. The method of claim 27, wherein the first package subscription information indicates that the package of media presentations is not associated with the closed state, further comprising:
- presenting the one of the media presentations of the package of media presentations on the device, wherein the information stored on the device corresponds to the second package subscription information, or the device requests, and receives, a subscription to the package of media presentations.

31. The method of claim 26, further comprising:
- providing a second package subscription information that is indicative of a package weight used by the device to determine the order in which the package information is presented relative to package information of other packages; and
- transmitting the second package subscription information to the device with the package information and the first package subscription information.

32. The method of claim 26, further comprising:
- providing a second package subscription information that is indicative of at least one other package of media presentations for which a subscription is required in order to subscribe to the package of media presentations; and
- transmitting the second package subscription information to the device with the package information and the first package subscription information.

33. The method of claim 26, further comprising:
- providing a second package subscription information that is indicative of at least one other package of media presentations for which a subscription is excluded after subscribing the package of media presentations; and transmitting the second package subscription information to the device with the package information and the first package subscription information.

34. A method of receiving package information, comprising:
    receiving, by a device, package information relating to a package of media presentations, wherein the device is configured to display the media presentations of the package;
    receiving a first package subscription information that indicates whether the package of media presentations is associated with a closed state, the closed state indicating that the package of media presentations is closed to new subscribers to the package but that the media presentations of the package are available to existing subscribers to the package; and
    allowing a request to subscribe to the package of media presentations, wherein the first package subscription information indicates that the package is not associated with the closed state.

35. The method of claim 34, further comprising:
    receiving a second package subscription information corresponding to presenting one of the package of media presentations, wherein the second package subscription information is distinct from the first package subscription information; and
    comparing the second package subscription information to information stored on the device.

36. The method of claim 35, wherein the first package subscription information indicates that the package of media presentations is not associated with the closed state, the method further comprising:
    presenting, on the device, the one of the media presentations of the package, wherein the information stored on the device corresponds to the second package subscription information, or the device requests, and receives, a subscription to the package of media presentations.

37. The method of claim 34, wherein the package of media presentations is associated with a billing and customer service (BCS) provider and the device is associated with the BCS provider through a subscription agreement.

38. The method of claim 34, further comprising:
    receiving a second package subscription information comprising a package weight;
    determining, based on the package weight, an order in which to present the package information relative to other package information corresponding to other packages of media presentations; and
    presenting, on the device, at least some of the package information in accordance with the determined order.

39. The method of claim 34, further comprising:
    receiving a second package subscription information that is indicative of at least one other package of media presentations; and
    the allowing the request to subscribe to the package of media presentations further comprises allowing the request to subscribe to the package of media presentations, wherein the first package subscription information indicates that the package is not associated with the closed state and the device is subscribed to the at least one other package.

40. The method of claim 34, further comprising:
    receiving a second package subscription information that is indicative of at least one other package of media presentations; and
    preventing the device from subscribing to the at least one other package of media presentations, wherein the device is subscribed to the package of media presentations.

41. At least one processor configured to perform the actions of:
    providing package information relating to a package of media presentations,
    providing a first package subscription information that indicates whether the package of media presentations is associated with a closed state, the closed state indicating that the package of media presentations is closed to new subscribers to the package but that the media presentations of the package are available to existing subscribers to the package; and
    transmitting the package information and the first package subscription information to a device configured to display the media presentations of the package.

42. The at least one processor of claim 41 configured to perform the further actions of:
    providing a second package subscription information that is used to determine whether the device can present one of the media presentations of the package of media presentations; and
    transmitting the second package subscription information to the device with the package information and the first package subscription information.

43. The at least one processor of claim 42, wherein the second package subscription information is used to determine whether the device can present all of the media presentations of the package of media presentations.

44. The at least one processor of claim 42, wherein the first package subscription information indicates that the package of media presentations is associated with the closed state, and configured to perform the further actions of:
    presenting the one of the media presentations of the package of media presentations on the device, wherein information stored on the device corresponds to the second package subscription information.

45. The at least one processor of claim 42, wherein the first package subscription information indicates that the package of media presentations is not associated with the closed state, and configured to perform the further actions of:
    presenting the one of the media presentations of the package of media presentations on the device, wherein the information stored on the device corresponds to the second package subscription information, or the device requests, and receives, a subscription to the package of media presentations.

46. The at least one processor of claim 41 configured to perform the further actions of:
    providing a second package subscription information that is indicative of a package weight used by the device to determine the order in which the package information is presented relative to package information of other packages; and
    transmitting the second package subscription information to the device with the package information and the first package subscription information.

47. The at least one processor of claim 41 configured to perform the further actions of:
    providing a second package subscription information that is indicative of at least one other package of media presentations for which a subscription is required in order to subscribe to the package of media presentations; and transmitting the second package subscription information to the device with the package information and the first package subscription information.

48. The at least one processor of claim 41 configured to perform the further actions of:
providing a second package subscription information that is indicative of at least one other package of media presentations for which a subscription is excluded after subscribing the package of media presentations; and
transmitting the second package subscription information to the device with the package information and the first package subscription information.

49. At least one processor configured to perform the actions of:
receiving, by a device, package information relating to a package of media presentations, wherein the device is configured to display the media presentations of the package;
receiving a first package subscription information that indicates whether the package of media presentations is associated with a closed state, the closed state indicating that the package of media presentations is closed to new subscribers to the package but that the media presentations of the package are available to existing subscribers to the package; and
allowing a request to subscribe to the package of media presentations, wherein the first package subscription information indicates that the package is not associated with the closed state.

50. The at least one processor of claim 49 configured to perform the further actions of:
receiving a second package subscription information corresponding to presenting one of the package of media presentations, wherein the second package subscription information is distinct from the first package subscription information; and
comparing the second package subscription information to information stored on the device.

51. The at least one processor of claim 50, wherein the first package subscription information indicates that the package of media presentations is not associated with the closed state, and configured to perform the further actions of:
presenting, on the device, the one of the media presentations of the package, wherein the information stored on the device corresponds to the second package subscription information, or the device requests, and receives, a subscription to the package of media presentation.

52. The at least one processor of claim 49, wherein the package of media presentations is associated with a billing and customer service (BCS) provider and the device is associated with the BCS provider through a subscription agreement.

53. The at least one processor of claim 49 configured to perform the further actions of:
receiving a second package subscription information comprising a package weight;
determining, based on the package weight, an order in which to present the package information relative to other package information corresponding to other packages of media presentations; and
presenting, on the device, at least some of the package information in accordance with the determined order.

54. The at least one processor of claim 49 configured to perform the further actions of:
receiving a second package subscription information that is indicative of at least one other package of media presentations; and
the allowing the request to subscribe to the package of media presentations further comprises allowing the request to subscribe to the package of media presentations, wherein the first package subscription information indicates that the package is not associated with the closed state and the device is subscribed to the at least one other package.

55. The at least one processor of claim 49 configured to perform the further actions of:
receiving a second package subscription information that is indicative of at least one other package of media presentations; and
preventing the device from subscribing to the at least one other package of media presentations, wherein the device is subscribed to the package of media presentations.

56. A computer program resident in a non-transitory computer readable medium that, when executed, directs a computer device to perform the actions of:
providing package information relating to a package of media presentations,
providing a first package subscription information that indicates whether the package of media presentations is associated with a closed state, the closed state indicating that the package of media presentations is closed to new subscribers to the package but that the media presentations of the package are available to existing subscribers to the package; and
transmitting the package information and the first package subscription information to a device configured to display the media presentations of the package.

57. The computer program resident in a non-transitory computer readable medium of claim 56, that further directs a computer device to perform the actions of:
providing a second package subscription information that is used to determine whether the device can present one of the media presentations of the package of media presentations; and
transmitting the second package subscription information to the device with the package information and the first package subscription information.

58. The computer program resident in a non-transitory computer readable medium of claim 57, wherein the second package subscription information is used to determine whether the device can present all of the media presentations of the package of media presentations.

59. The computer program resident in a non-transitory computer readable medium of claim 57, wherein the first package subscription information indicates that the package of media presentations is associated with the closed state, and that further directs a computer device to perform the actions of:
presenting the one of the media presentations of the package of media presentations on the device, wherein information stored on the device corresponds to the second package subscription information.

60. The computer program resident in a non-transitory computer readable medium of claim 57, wherein the first package subscription information indicates that the package of media presentations is not associated with the closed state, and that further directs a computer device to perform the actions of:
presenting the one of the media presentations of the package of media presentations on the device, wherein the information stored on the device corresponds to the second package subscription information, or the device requests, and receives, a subscription to the package of media presentations.

61. The computer program resident in a non-transitory computer readable medium of claim 56 that further directs a computer device to perform the actions of:
providing a second package subscription information that is indicative of a package weight used by the device to determine the order in which the package information is presented relative to package information of other packages; and
transmitting the second package subscription information to the device with the package information and the first package subscription information.

62. The computer program resident in a non-transitory computer readable medium of claim 56 that further directs a computer device to perform the actions of:
providing a second package subscription information that is indicative of at least one other package of media presentations for which a subscription is required in order to subscribe to the package of media presentations; and
transmitting the second package subscription information to the device with the package information and the first package subscription information.

63. The computer program resident in a non-transitory computer readable medium of claim 56 that further directs a computer device to perform the actions of:
providing a second package subscription information that is indicative of at least one other package of media presentations for which a subscription is excluded after subscribing the package of media presentations; and
transmitting the second package subscription information to the device with the package information and the first package subscription information.

64. A computer program resident in a non-transitory computer readable medium that, when executed, directs a computer device to perform the actions of:
receiving, by a device, package information relating to a package of media presentations, wherein the device is configured to display the media presentations of the package;
receiving a first package subscription information that indicates whether the package of media presentations is associated with a closed state, the closed state indicating that the package of media presentations is closed to new subscribers to the package but that the media presentations of the package are available to existing subscribers to the package; and
allowing a request to subscribe to the package of media presentations, wherein the first package subscription information indicates that the package is not associated with the closed state.

65. The computer program resident in a non-transitory computer readable medium of claim 64, that further directs a computer device to perform the actions of:
receiving a second package subscription information corresponding to presenting one of the package of media presentations, wherein the second package subscription information is distinct from the first package subscription information; and
comparing the second package subscription information to information stored on the device.

66. The computer program resident in a non-transitory computer readable medium of claim 65, wherein the first package subscription information indicates that the package of media presentations is not associated with the closed state, and that further directs a computer device to perform the actions of:
presenting, on the device, the one of the media presentations of the package, wherein the information stored on the device corresponds to the second package subscription information, or the device requests, and receives, a subscription to the package of media presentation.

67. The computer program resident in a non-transitory computer readable medium of claim 64, wherein the package of media presentations is associated with a billing and customer service (BCS) provider and the device is associated with the BCS provider through a subscription agreement.

68. The computer program resident in a non-transitory computer readable medium of claim 64, that further directs a computer device to perform the actions of:
receiving a second package subscription information comprising a package weight;
determining, based on the package weight, an order in which to present the package information relative to other package information corresponding to other packages of media presentations; and
presenting, on the device, at least some of the package information in accordance with the determined order.

69. The computer program resident in a non-transitory computer readable medium of claim 64, that further directs a computer device to perform the actions of:
receiving a second package subscription information that is indicative of at least one other package of media presentations; and
the allowing the request to subscribe to the package of media presentations further comprises allowing the request to subscribe to the package of media presentations, wherein the first package subscription information indicates that the package is not associated with the closed state and the device is subscribed to the at least one other package.

70. The computer program resident in a non-transitory computer readable medium of claim 64, that further directs a computer device to perform the actions of:
receiving a second package subscription information that is indicative of at least one other package of media presentations; and
preventing the device from subscribing to the at least one other package of media presentations, wherein the device is subscribed to the package of media presentations.

71. An apparatus for providing media program information, comprising:
means for providing package information relating to a package of media presentations,
means for providing a first package subscription information that indicates whether the package of media presentations is associated with a closed state, the closed state indicating that the package of media presentations is closed to new subscribers to the package but that the media presentations of the package are available to existing subscribers to the package; and
means for transmitting the package information and the first package subscription information to a device configured to display the media presentations of the package.

72. The apparatus of claim 71, further comprising:
means for providing a second package subscription information that is used to determine whether the device can present one of the media presentations of the package of media presentations; and means for transmitting the second package subscription information to the device with the package information and the first package subscription information.

73. The apparatus of claim 72, wherein the second package subscription information is used to determine whether the device can present all of the media presentations of the package of media presentations.

74. The apparatus of claim 72, wherein the first package subscription information indicates that the package of media presentations is associated with the closed state, further comprising:
means for presenting the one of the media presentations of the package of media presentations on the device, wherein information stored on the device corresponds to the second package subscription information.

75. The apparatus of claim 72, wherein the first package subscription information indicates that the package of media presentations is not associated with the closed state, further comprising:
means for presenting the one of the media presentations of the package of media presentations on the device, wherein the information stored on the device corresponds to the second package subscription information, or the device requests, and receives, a subscription to the package of media presentations.

76. The apparatus of claim 71, further comprising:
means for providing a second package subscription information that is indicative of a package weight used by the device to determine the order in which the package information is presented relative to package information of other packages; and
means for transmitting the second package subscription information to the device with the package information and the first package subscription information.

77. The apparatus of claim 71, further comprising:
means for providing a second package subscription information that is indicative of at least one other package of media presentations for which a subscription is required in order to subscribe to the package of media presentations; and
means for transmitting the second package subscription information to the device with the package information and the first package subscription information.

78. The apparatus of claim 71, further comprising:
means for providing a second package subscription information that is indicative of at least one other package of media presentations for which a subscription is excluded after subscribing the package of media presentations; and
means for transmitting the second package subscription information to the device with the package information and the first package subscription information.

79. An apparatus for providing media program information, comprising:
means for receiving, by a device, package information relating to a package of media presentations, wherein the device is configured to display the media presentations of the package;
means for receiving a first package subscription information that indicates whether the package of media presentations is associated with a closed state, the closed state indicating that the package of media presentations is closed to new subscribers to the package but that the media presentations of the package are available to existing subscribers to the package; and
means for allowing a request to subscribe to the package of media presentations, wherein the first package subscription information indicates that the package is not associated with the closed state.

80. The apparatus of claim 79, further comprising:
means for receiving a second package subscription information corresponding to presenting one of the package of media presentations, wherein the second package subscription information is distinct from the first package subscription information; and
means for comparing the second package subscription information to information stored on the device.

81. The apparatus of claim 80, wherein the first package subscription information indicates that the package of media presentations is not associated with the closed state, further comprising:
means for presenting, on the device, the one of the media presentations of the package, wherein the information stored on the device corresponds to the second package subscription information, or the device requests, and receives, a subscription to the package of media presentations.

82. The apparatus of claim 79, wherein the package of media presentations is associated with a billing and customer service (BCS) provider and the device is associated with the BCS provider through a subscription agreement.

83. The apparatus of claim 79, further comprising:
means for receiving a second package subscription information comprising a package weight;
means for determining, based on the package weight, an order in which to present the package information relative to other package information corresponding to other packages of media presentations; and
means for presenting, on the device, at least some of the package information in accordance with the determined order.

84. The apparatus of claim 79, further comprising:
means for receiving a second package subscription information that is indicative of at least one other package of media presentations; and
means for the allowing the request to subscribe to the package of media presentations further comprises allowing the request to subscribe to the package of media presentations, wherein the first package subscription information indicates that the package is not associated with the closed state and the device is subscribed to the at least one other package.

85. The apparatus of claim 79, further comprising:
means for receiving a second package subscription information that is indicative of at least one other package of media presentations; and
means for preventing the device from subscribing to the at least one other package of media presentations, wherein the device is subscribed to the package of media presentations.

* * * * *